(12) United States Patent
Tani et al.

(10) Patent No.: US 11,352,742 B2
(45) Date of Patent: Jun. 7, 2022

(54) INKJET TEXTILE PRINTING METHOD, COLORING COMPOSITION, INKJET INK, INK CARTRIDGE, AND DYE POLYMER

(71) Applicant: FUJIFILM Corporation, Tokyo (JP)

(72) Inventors: Yukio Tani, Kanagawa (JP); Yoshihiko Fujie, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 432 days.

(21) Appl. No.: 16/258,674

(22) Filed: Jan. 28, 2019

(65) Prior Publication Data

US 2019/0153670 A1    May 23, 2019

Related U.S. Application Data

(63) Continuation of application No. PCT/JP2017/026368, filed on Jul. 20, 2017.

(30) Foreign Application Priority Data

Jul. 28, 2016 (JP) .............................. JP2016-148850

(51) Int. Cl.
| | | |
|---|---|---|
| C09D 11/00 | (2014.01) | |
| C09D 11/328 | (2014.01) | |
| D06P 1/00 | (2006.01) | |
| D06P 5/30 | (2006.01) | |
| C09B 69/10 | (2006.01) | |
| C08G 18/73 | (2006.01) | |
| C08G 18/38 | (2006.01) | |
| C08G 18/22 | (2006.01) | |
| C08G 18/08 | (2006.01) | |
| C08G 18/32 | (2006.01) | |
| B41J 2/175 | (2006.01) | |
| C08G 18/72 | (2006.01) | |
| C09D 1/00 | (2006.01) | |
| C09D 4/00 | (2006.01) | |
| C09D 5/00 | (2006.01) | |
| C09K 3/00 | (2006.01) | |

(52) U.S. Cl.
CPC ......... *D06P 1/0052* (2013.01); *B41J 2/17506* (2013.01); *C08G 18/0823* (2013.01); *C08G 18/227* (2013.01); *C08G 18/32* (2013.01); *C08G 18/38* (2013.01); *C08G 18/72* (2013.01); *C08G 18/73* (2013.01); *C09B 69/10* (2013.01); *C09B 69/103* (2013.01); *C09D 11/328* (2013.01); *D06P 5/30* (2013.01)

(58) Field of Classification Search
USPC ................... 106/31.01, 31.13, 31.27, 31.43
See application file for complete search history.

(56) References Cited

U.S. PATENT DOCUMENTS

| | | | |
|---|---|---|---|
| 6,455,611 B1 | 9/2002 | Pears et al. | |
| 6,632,858 B1 | 10/2003 | Pears et al. | |
| 8,636,814 B2 * | 1/2014 | Fujie ................... | C09D 11/328 |
| | | | 106/31.47 |
| 8,845,760 B2 * | 9/2014 | Fujie .................... | C09B 55/006 |
| | | | 106/31.13 |
| 9,023,138 B2 * | 5/2015 | Fujie ................... | C09B 29/3639 |
| | | | 106/31.47 |
| 9,023,139 B2 * | 5/2015 | Fujie .................. | C08K 5/34926 |
| | | | 106/31.47 |
| 9,389,347 B2 * | 7/2016 | Fujie ................... | C09B 69/109 |
| 9,670,364 B2 * | 6/2017 | Fujie ................... | C09D 11/328 |
| 10,487,210 B2 * | 11/2019 | Yagi ....................... | C09B 11/28 |
| 10,689,535 B2 * | 6/2020 | Tateishi ............... | C09D 11/328 |
| 10,703,910 B2 * | 7/2020 | Tateishi ................ | C09B 11/24 |
| 10,711,148 B2 * | 7/2020 | Tateishi ............... | C09D 11/328 |
| 2004/0102542 A1 | 5/2004 | Pears et al. | |
| 2005/0036018 A1 | 2/2005 | Yanagihara et al. | |
| 2016/0108161 A1 | 4/2016 | Kaneko et al. | |
| 2016/0327859 A1 | 11/2016 | Idei et al. | |
| 2018/0327619 A1 | 11/2018 | Fujie et al. | |

FOREIGN PATENT DOCUMENTS

| | | | |
|---|---|---|---|
| CN | 103254396 | 8/2013 | |
| CN | 103172829 | 10/2014 | |
| EP | 1362082 B1 * | 10/2011 | |
| EP | 1362082 B1 * | 10/2011 | ............. C09D 11/32 |
| EP | 3409831 | 12/2018 | |
| JP | H07304994 | 11/1995 | |
| JP | H10058638 | 3/1998 | |
| JP | H11293164 | 10/1999 | |
| JP | 2002509957 | 4/2002 | |
| JP | 2002509974 | 4/2002 | |
| JP | 2002348502 | 12/2002 | |
| JP | 2004516355 | 6/2004 | |
| JP | 2010037700 | 2/2010 | |

(Continued)

OTHER PUBLICATIONS

English translation of JPH 07/304994, Nov. 1995; 7 pages.*
English translation of CN 103172829, Oct. 2014; 16 pages.*
"Office Action of Japan Counterpart Application," with English translation thereof, dated Feb. 4, 2020, p. 1-p. 10.
"Search Report of Europe Counterpart Application", dated Jul. 9, 2019, p. 1-p. 12.

(Continued)

*Primary Examiner* — James E Mcdonough
(74) *Attorney, Agent, or Firm* — JCIPRNET

(57) ABSTRACT

Provided are an inkjet textile printing method including a step of performing direct printing on a textile by an inkjet method with an inkjet ink including an aqueous dispersion of a dye polymer having a structure derived from a dye having a xanthene skeleton; a coloring composition and an inkjet ink including the aqueous dispersion of the dye polymer; an ink cartridge including the inkjet ink filling the ink cartridge; and the dye polymer.

18 Claims, No Drawings

(56) References Cited

FOREIGN PATENT DOCUMENTS

| JP | 2016069656 | 5/2016 |
| WO | 2015115415 | 8/2015 |
| WO | 2015147112 | 10/2015 |
| WO | 2017131107 | 8/2017 |

OTHER PUBLICATIONS

"International Search Report (Form PCT/ISA/210) of PCT/JP2017/026368," dated Oct. 24, 2017, with English translation thereof, pp. 1-5.

"International Preliminary Report on Patentability (Form PCT/IPEA/409) of PCT/JP2017/026368," completed on Jul. 31, 2018, with English translation thereof, pp. 1-14.

* cited by examiner

INKJET TEXTILE PRINTING METHOD, COLORING COMPOSITION, INKJET INK, INK CARTRIDGE, AND DYE POLYMER

CROSS-REFERENCE TO RELATED APPLICATIONS

This is a continuation of International Application No. PCT/JP2017/026368 filed on Jul. 20, 2017 and claims priority from Japanese Patent Application No. 2016-148850 filed in the Japan Patent Office on Jul. 28, 2016, and the contents of which are herein incorporated by reference.

BACKGROUND OF THE INVENTION

1. Field of the Invention

The present invention relates to an inkjet textile printing method, a coloring composition, an inkjet ink, an ink cartridge, and a dye polymer.

2. Description of the Related Art

Coloring agents having been used for coloring textiles are dye or pigment. Such coloring agents have been used to industrially color textiles by, for example, a screen printing method, a roller printing method, a transfer method, or an inkjet method. In particular, compared with other methods, the inkjet method does not require preparation of plates, and enables rapid formation of high gradation images; in addition, the method uses inks in amounts only required for forming images, and hence is an excellent image-forming method having environmental advantages, for example, a small amount of waste fluid.

For example, JP2002-348502A describes an inkjet textile printing in which dye is dissolved in water to prepare ink, and an inkjet method is performed to dye a textile.

Dye molecules each interact with fiber so that the molecules penetrate into the fiber and are integrated with the fiber. Thus, textiles dyed with dye feel soft, and are popular as clothing due to the quality. On the other hand, inkjet textile printing using dye requires coating of a textile with printing paste in advance in order to prevent bleeding (to improve sharpness); in addition, after dyeing, the colored textile needs to be heated with steam in order to fix the dye; subsequently, excess dye and printing paste need to be washed off by a step such as rinsing or soaping. Thus, such steps are complicated, require apparatuses and labor, and generate waste fluid.

Coloring using dye needs to be performed with dyes appropriately selected in accordance with the type of fiber. For example, reactive dye or direct dye is used for cellulose fiber such as cotton and hemp, acid dye for animal fiber such as wool and silk, acid dye or disperse dye for nylon fiber, disperse dye for polyester fiber, and cationic dye for acrylic fiber.

As a dyeing method having been improved in terms of the above-described problems in which the steps of the ordinary inkjet textile printing are complicated, require apparatuses and labor, and generate waste fluid, an inkjet sublimation transfer textile printing method is widely practiced (for example, refer to JP1998-58638A (JP-H10-58638A)). The inkjet sublimation transfer textile printing method is a method in which a pattern for textile printing is printed, on transfer paper, with an inkjet printer and with an ink including resin particles containing disperse dye, and subsequently this transfer paper and a polyester textile are placed on top of each other, and heat-treated, to thereby transfer the sublimable dye from the resin particles onto the polyester textile.

However, the dyeing mechanism of this method is recognized as thermal diffusion or thermal sublimation of dye molecules, or a phenomenon of both of these. For this reason, this method uses a dye that is one of disperse dyes, sublimation dye, so that the method is mainly used only for dyeing polyester textiles. In addition, transfer paper having been used cannot be recycled, and hence treated as industrial waste.

On the other hand, an inkjet coloring method using pigment has also been studied (for example, refer to JP2010-37700A). In this method, pigment and surfactant serving as a dispersing agent are mixed in water, and subsequently subjected to fine dispersion together with, for example, glass beads, zirconia beads, titania beads, or stainless steel balls, and with an attritor or a milling machine, and the resultant dispersion is used as a coloring agent. This coloring agent is diluted with a reducer containing an emulsion resin for fixing pigment to prepare pigment ink; the pigment ink is caused to adhere to fiber by an inkjet method, and a heating roller is used to fuse the resin to thereby fix the pigment.

Unlike the dye coloring method, such a pigment coloring method does not require selection of the coloring agent in accordance with the type of fiber, and does not require the complicated steam heating (steaming) step and rinsing step, to thereby enable very simple coloring of fiber and fixing of pigment.

However, pigment adheres to (is mounted on) fiber, in the form of aggregate particles of pigment molecules. Thus, in order to maintain the colorfastness of colored cloths (colored textiles) such as colorfastness to washing and laundering and colorfastness to nabbing, a large amount of emulsion resin is required as a fixing agent. This provides colored cloths that feel hard and have clothing quality inferior to that of colored cloths dyed with dye. In addition, the emulsion resin dries due to evaporation of the water component, and the viscosity of pigment ink increases; this tends to cause a phenomenon such as clogging of the inkjet printer, which causes poor operability.

SUMMARY OF THE INVENTION

As described above, coloring with dye provides colored cloths of high quality (feeling and colorfastness), but has problems such as a problem of complicated steps requiring selection of dye in accordance with the type of fiber and requiring a step of applying printing paste, a problem of requiring equipment, and a problem of being poor in terms of environmental load for waste liquid, waste material, and the like. On the other hand, coloring with pigment does not require selection of dye in accordance with the type of fiber and is performed by simple steps, but has a problem of, for example, operability in terms of clogging of the inkjet printer due to an increase in the viscosity of the ink, and has a problem of often providing colored cloths of poor quality (feeling).

Accordingly, an object of the present invention is to provide an inkjet textile printing method that enables dyeing of various types of textiles, that does not require the step of applying printing paste, that causes less environmental load, that is performed with sufficient operability, that provides images having high sharpness and high colorfastness, and that provides colored cloths of high quality (feeling). Another object of the present invention is to provide a dye polymer, a coloring composition, and an inkjet ink that enable dyeing of various types of textiles, that do not require the step of applying printing paste, that cause less environmental load, that enable sufficient operability, and that provide images having high sharpness and high colorfastness and colored cloths of high quality (feeling); and an ink cartridge including the inkjet ink filling the ink cartridge.

The inventors of the present invention performed thorough studies on how to achieve such an object. As a result, they have found that a method of performing direct printing on a textile by an inkjet method with an aqueous dispersion of a dye polymer including a structure derived from a dye having a xanthene skeleton enables dyeing of various types of textiles, does not require the step of applying printing paste, causes less environmental load, is performed with sufficient operability, and provides colored cloths of high quality.

The mechanism by which the method achieves the object has not been completely found. However, the inventors of the present invention infer the mechanism as follows.

The aqueous dispersion of the dye polymer provides the dye polymer not in the form of an aqueous solution, but in the form of an aqueous dispersion. Thus, as with pigment particles, bleeding does not occur, the step of applying printing paste is not necessary, and the rinsing step is also not necessary so that waste liquid is not generated. In addition, direct printing is performed on textiles, so that waste materials such as transfer paper are not generated. Unlike pigment ink, emulsion resin serving as a fixing agent is not used, so that an increase in the viscosity of the ink does not occur, and high operability is achieved. In addition, the dye polymer is inferentially integrated with fiber on the molecular level so as to cover the surface of the fiber irrespective of the type of the fiber. This inferentially enables dyeing of textiles of various types of fibers, and provides colored cloths of high quality.

Incidentally, in the present invention, "performing direct printing" on a textile by an inkjet method with an inkjet ink means that the transfer step is not necessary and the inkjet ink is directly applied to the textile, and that the step of applying printing paste is not necessary and the inkjet ink is directly applied to the textile.

Objects of the present invention are achieved specifically by the following means.

<1>

An inkjet textile printing method including a step of performing direct printing on a textile by an inkjet method with an inkjet ink including an aqueous dispersion of a dye polymer having a structure derived from a dye having a xanthene skeleton.

<2>

The inkjet textile printing method according to <1>, wherein the dye polymer further has a urethane bond.

<3>

The inkjet textile printing method according to <1> or <2>, wherein the dye polymer further has a repeating unit including —COOM, where M represents a hydrogen atom or a counter cation.

<4>

The inkjet textile printing method according to any one of <1> to <3>, further including a heat treatment step.

<5>

The inkjet textile printing method according to any one of <1> to <4>, wherein the inkjet ink further includes an aqueous organic solvent.

<6>

The inkjet textile printing method according to any one of <1> to <5>, wherein the dye polymer has a repeating unit represented by a general formula (1-2) below.

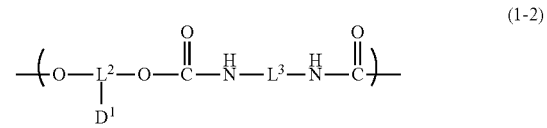

In the general formula (1-2), $L^2$ and $L^3$ each independently represent a linking group, and $D^1$ represents a dye residue in which any one hydrogen atom has been removed from a dye having a xanthene skeleton.

<7>

The inkjet textile printing method according to <6>, wherein $D^1$ in the general formula (1-2) represents a dye residue in which any one hydrogen atom has been removed from a dye represented by a general formula (M1) below.

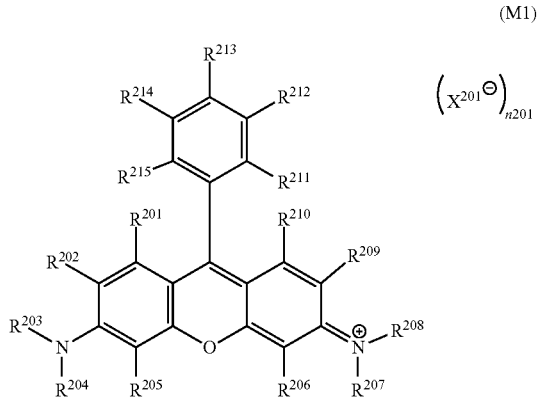

In the general formula (M1), $R^{201}$ to $R^{215}$ each independently represent a hydrogen atom or a substituent, $X^{201}$ represents a monovalent anion, and n201 represents 0 or 1.

<8>

The inkjet textile printing method according to any one of <1> to <5>, wherein the dye polymer has a repeating unit represented by a general formula (1-3) below.

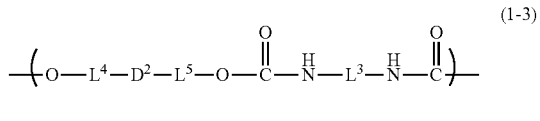

In the general formula (1-3), $L^3$ represents a linking group, $L^4$ and $L^5$ each independently represent a single bond or a linking group, and $D^2$ represents a dye residue in which any two hydrogen atoms have been removed from a dye having a xanthene skeleton.

<9>

The inkjet textile printing method according to <8>, wherein $D^2$ in the general formula (1-3) represents a dye residue in which any two hydrogen atoms have been removed from a dye represented by a general formula (M1) below.

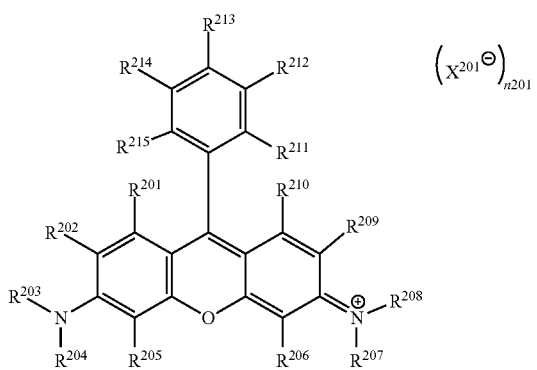

(M1)

In the general formula (M1), $R^{201}$ to $R^{215}$ each independently represent a hydrogen atom or a substituent, $X^{201}$ represents a monovalent anion, and n201 represents 0 or 1.
<10>
A coloring composition including an aqueous dispersion of a dye polymer having a structure derived from a dye having a xanthene skeleton.
<11>
An inkjet ink including an aqueous dispersion of a dye polymer having a structure derived from a dye having a xanthene skeleton.
<12>
The inkjet ink according to <11>, further including an aqueous organic solvent.
<13>
The inkjet ink according to <11> or <12>, wherein the dye polymer in the aqueous dispersion of the dye polymer is a particulate dye polymer, and the particulate dye polymer has an average particle size of 30 to 500 nm.
<14>
The inkjet ink according to any one of <11> to <13>, wherein the dye polymer in the aqueous dispersion of the dye polymer has a weight-average molecular weight of 2,000 to 2,000,000.
<15>
The inkjet ink according to any one of <11> to <14>, being used for textile printing.
<16>
An ink cartridge including the inkjet ink according to any one of <11> to <15> filling the ink cartridge.
<17>
A dye polymer including a structure derived from a dye having a xanthene skeleton, and a urethane bond.
<18>
The dye polymer according to <17>, further including a repeating unit including an acidic group.
<19>
The dye polymer according to <18>, wherein the acidic group is —COOM, where M represents a hydrogen atom or a counter cation.

The present invention provides an inkjet textile printing method that enables dyeing of various types of textiles, that does not require the step of applying printing paste, that is excellent in terms of environmental load, that is performed with sufficient operability, that provides images having high sharpness and high colorfastness, and that provides colored cloths of high quality (feeling). The present invention also provides a dye polymer, a coloring composition, and an inkjet ink that enable dyeing of various types of textiles, that do not require the step of applying printing paste, that are excellent in terms of environmental load, that enable sufficient operability, and that provide images having high sharpness and high colorfastness and colored cloths of high quality (feeling); and an ink cartridge including the inkjet ink filling the ink cartridge.

DESCRIPTION OF THE PREFERRED EMBODIMENTS

Hereinafter, the present invention will be described in detail.

In this Specification, ranges defined by a value "to" a value include these values as the minimum value and the maximum value.

In this Specification, Substituent group A includes the following substituents.

Substituent Group A

The Substituent group A includes the following substituents:

halogen atoms (for example, a fluorine atom, a chlorine atom, and a bromine atom), alkyl groups (preferably a linear, branched, or cyclic alkyl group having 1 to 48 carbon atoms, more preferably 1 to 24 carbon atoms, for example, a methyl group, an ethyl group, a propyl group, an isopropyl group, a butyl group, a t-butyl group, a pentyl group, a hexyl group, a heptyl group, an octyl group, a 2-ethylhexyl group, a dodecyl group, a hexadecyl group, a cyclopropyl group, a cyclopentyl group, a cyclohexyl group, a 1-norbornyl group, and a 1-adamantyl group); alkenyl groups (preferably an alkenyl group having 2 to 48 carbon atoms, more preferably 2 to 18 carbon atoms, for example, a vinyl group, an allyl group, and a 3-buten-1-yl group); aryl groups (preferably an aryl group having 6 to 48 carbon atoms, more preferably 6 to 24 carbon atoms, for example, a phenyl group and a naphthyl group); heterocyclic groups (preferably a heterocyclic group having 1 to 32 carbon atoms, more preferably 1 to 18 carbon atoms, for example, a 2-thienyl group, a 4-pyridyl group, a 2-furyl group, a 2-pyrimidinyl group, a 1-pyridyl group, a 2-benzothiazolyl group, a 1-imidazolyl group, a 1-pyrazolyl group, and a benzotriazol-1-yl group); silyl groups (preferably a silyl group having 3 to 38 carbon atoms, more preferably 3 to 18 carbon atoms, for example, a trimethylsilyl group, a triethylsilyl group, a tributylsilyl group, a t-butyldimethylsilyl group, and a t-hexyldimethylsilyl group); a hydroxyl group; a cyano group; a nitro group; alkoxy groups (preferably a linear, branched, or cyclic alkoxy group having 1 to 48 carbon atoms, more preferably 1 to 24 carbon atoms, for example, a methoxy group, an ethoxy group, a 1-butoxy group, a 2-butoxy group, an isopropoxy group, a t-butoxy group, a dodecyloxy group, a cyclopentyloxy group, and a cyclohexyloxy group); aryloxy groups (preferably an aryloxy group having 6 to 48 carbon atoms, more preferably 6 to 24 carbon atoms, for example, a phenoxy group, and a 1-naphthoxy group); heterocyclic oxy groups (preferably a heterocyclic oxy group having 1 to 32 carbon atoms, more preferably 1 to 18 carbon atoms, for example, a 1-phenyltetrazole-5-oxy group, and a 2-tetrahydropyranyloxy group); silyloxy groups (preferably a silyloxy group having 1 to 32 carbon atoms, more preferably 1 to 18 carbon atoms, for example, a trimethylsilyloxy group, a t-butyldimethylsilyloxy group, and a diphenylmethylsilyloxy group); acyloxy groups (preferably an acyloxy group having 2 to 48 carbon atoms, more preferably 2 to 24 carbon atoms, for example, an acetoxy group, a pivaloyloxy group, a benzoyloxy group, and a dodecanoyloxy group); alkoxycarbonyloxy groups (preferably a linear, branched, or cyclic alkoxycarbonyloxy group having 2 to 48 carbon atoms, more preferably 2 to 24 carbon atoms, for example, an ethoxycarbonyloxy group, a t-butoxycarbonyloxy group, and a cyclohexyloxycarbonyloxy group); aryloxycarbonyloxy groups (preferably an aryloxycarbonyloxy group having 7 to 32 carbon atoms, more preferably 7 to 24 carbon atoms, for example, a phenoxycarbonyloxy group); carbamoyloxy groups (preferably a carbamoyloxy group having 1 to 48 carbon atoms, more preferably 1 to 24 carbon atoms, for example, an N,N-dimethylcarbamoyloxy group, an N-butylcarbamoyloxy group, an N-phenylcarbamoyloxy group, and an N-ethyl-N-phenylcarbamoyloxy group); sulfamoyloxy groups (preferably a sulfamoyloxy group having 1 to 32 carbon atoms, more preferably 1 to 24 carbon atoms, for example, an N,N-diethylsulfamoyloxy group, and an N-propylsulfamoyloxy group); alkylsulfonyloxy groups (preferably an alkylsulfonyloxy group having 1 to 38 carbon atoms, more preferably 1 to 24 carbon atoms, for example, a methylsulfonyloxy group, a hexadecylsulfonyloxy group, and a cyclohexylsulfonyloxy group); arylsulfonyloxy groups (preferably an arylsulfonyloxy group having 6 to 32 carbon atoms, more preferably 6 to 24 carbon atoms, for example, a phenylsulfonyloxy group); acyl groups (preferably a linear, branched, or cyclic acyl group having 1 to 48 carbon atoms, more preferably 1 to 24 carbon atoms, for example, a formyl group, an acetyl group, a pivaloyl group, a benzoyl group, a tetradecanoyl group, and a cyclohexanoyl group); alkoxycarbonyl groups (preferably a linear, branched, or cyclic alkoxycarbonyl group having 2 to 48 carbon atoms, more preferably 2 to 24 carbon atoms, for example, a methoxycarbonyl group, an ethoxycarbonyl group, an octadecyloxycarbonyl group, a cyclohexyloxycarbonyl group, and a 2,6-di-tert-butyl-4-methylcyclohexyloxycarbonyl group); aryloxycarbonyl groups (preferably an aryloxycarbonyl group having 7 to 32 carbon atoms, more preferably 7 to 24 carbon atoms, for example, a phenoxycarbonyl group); carbamoyl groups (preferably a carbamoyl group having 1 to 48 carbon atoms, more preferably 1 to 24 carbon atoms, for example, a carbamoyl group, an N,N-diethylcarbamoyl group, an N-ethyl-N-octylcarbamoyl group, an N,N-dibutylcarbamoyl group, an N-propylcarbamoyl group, an N-phenylcarbamoyl group, an N-methyl-N-phenylcarbamoyl group, and an N,N-dicyclohexylcarbamoyl group); amino groups (preferably an amino group having 32 or less carbon atoms, more preferably 24 or less carbon atoms, for example, an amino group, a methylamino group, an N,N-dibutylamino group, a tetradecylamino group, a 2-ethylhexylamino group, and a cyclohexylamino group); anilino groups (preferably an anilino group having 6 to 32 carbon atoms, more preferably 6 to 24 carbon atoms, for example, an anilino group, and an N-methylanilino group); heterocyclic amino groups (preferably a heterocyclic amino group having 1 to 32 carbon atoms, more preferably 1 to 18 carbon atoms, for example, a 4-pyridylamino group); carbonamido groups (preferably a carbonamido group having 2 to 48 carbon atoms, more preferably 2 to 24 carbon atoms, for example, an acetamido group, a benzamido group, a tetradecaneamido group, a pivaloylamido group, and a cyclohexaneamido group); ureido groups (preferably a ureido group having 1 to 32 carbon atoms, more preferably 1 to 24 carbon atoms, for example, a ureido group, an N,N-dimethylureido group, and an N-phenylureido group); imido groups (preferably an imido group having 36 or less carbon atoms, more preferably 24 or less carbon atoms, for example, an N-succinimido group, and an N-phthalimido group); alkoxycarbonylamino groups (preferably a linear, branched, or cyclic alkoxycarbonylamino group having 2 to 48 carbon atoms, more preferably 2 to 24 carbon atoms, for example, a methoxycarbonylamino group, an ethoxycarbonylamino group, a t-butoxycarbonylamino group, an octadecyloxycarbonylamino group, and a cyclohexyloxycarbonylamino group); aryloxycarbonylamino groups (preferably an aryloxycarbonylamino group having 7 to 32 carbon atoms, more preferably 7 to 24 carbon atoms, for example, a phenoxycarbonylamino group); sulfonamido groups (preferably a sulfonamido group having 1 to 48 carbon atoms, more preferably 1 to 24 carbon atoms, for example, a methanesulfonamido group, a butanesulfonamido group, a benzenesulfonamido group, a hexadecanesulfonamido group, and a cyclohexanesulfonamido group); sulfamoylamino groups (preferably a sulfamoylamino group having 1 to 48 carbon atoms, more preferably 1 to 24 carbon atoms, for example, an N,N-dipropylsulfamoylamino group, and an N-ethyl-N-dodecylsulfamoylamino group); azo groups (preferably an azo group having 1 to 32 carbon atoms, more preferably 1 to 24 carbon atoms, for example, a phenylazo group, and a 3-pyrazolylazo group); alkylthio groups (preferably a linear, branched, or cyclic alkylthio group having 1 to 48 carbon atoms, more preferably 1 to 24 carbon atoms, for example, a methylthio group, an ethylthio group, an octylthio group, and a cyclohexylthio group); arylthio groups (preferably an arylthio group having 6 to 48 carbon atoms, more preferably 6 to 24 carbon atoms, for example, a phenylthio group); heterocyclic thio groups (preferably a heterocyclic thio group having 1 to 32 carbon atoms, more preferably 1 to 18 carbon atoms, for example, a 2-benzothiazolylthio group, a 2-pyridylthio group, and a 1-phenyltetrazolylthio group); alkylsulfinyl groups (preferably a linear, branched, or cyclic alkylsulfinyl group having 1 to 32 carbon atoms, more preferably 1 to 24 carbon atoms, for example, a dodecanesulfinyl group); arylsulfinyl groups (preferably an arylsulfinyl group having 6 to 32 carbon atoms, more preferably 6 to 24 carbon atoms, for example, a phenylsulfinyl group); alkylsulfonyl groups (preferably a linear, branched, or cyclic alkylsulfonyl group having 1 to 48 carbon atoms, more preferably 1 to 24 carbon atoms, for example, a methylsulfonyl group, an ethylsulfonyl group, a propylsulfonyl group, a butylsulfonyl group, an isopropylsulfonyl group, a 2-ethylhexylsulfonyl group, a hexadecylsulfonyl group, an octylsulfonyl group, and a cyclohexylsulfonyl group); arylsulfonyl groups (preferably an arylsulfonyl group having 6 to 48 carbon atoms, more preferably 6 to 24 carbon atoms, for example, a phenylsulfonyl group, and a 1-naphthylsulfonyl group); sulfamoyl groups (preferably a sulfamoyl group having 32 or less carbon atoms, more preferably 24 or less carbon atoms, for example, a sulfamoyl group, an N,N-dipropylsulfamoyl group, an N-ethyl-N-dodecylsulfamoyl group, an N-ethyl-N-phenylsulfamoyl group, and an N-cyclohexylsulfamoyl group); a sulfo group; phosphonyl groups (preferably a phosphonyl group having 1 to 32 carbon atoms, more preferably 1 to 24 carbon atoms, for example, a phenoxyphosphonyl group, an octyloxyphosphonyl group, and a phenylphosphonyl); and phosphinoylamino groups (preferably a phosphinoylamino group having 1 to 32 carbon atoms, more preferably 1 to 24 carbon atoms, for example, a diethoxyphosphinoylamino group, and a dioctyloxyphosphinoylamino group).

Dye Polymer Having Structure Derived from Dye Having Xanthene Skeleton

In the present invention, the dye polymer including a structure derived from a dye having a xanthene skeleton (also simply referred to as "dye polymer") is not particularly limited as long as it is a polymer intramolecularly having a structure derived from a dye having a xanthene skeleton; the dye polymer may be a linear polymer, or a network polymer.

The dye polymer is preferably a coloring polymer including, as a repeating unit, a structure derived from a dye having a xanthene skeleton.

The structure derived from a dye having a xanthene skeleton is a group (dye residue) in which any one or more hydrogen atoms have been removed from a compound used as a dye having a xanthene skeleton.

Examples of the structure derived from a dye having a xanthene skeleton include structures derived from dyes classified in Colour Index (abbreviated as "C.I."); structures provided by substituting the foregoing structures with any substituent as long as advantages of the present invention are provided; and structures provided by removing any substituent from the foregoing structures as long as advantages of the present invention are provided.

The dye may be a water-soluble dye or a water-insoluble dye; however, from the viewpoint of the water resistance and washing resistance of the dye polymer, the dye is preferably a water-insoluble dye. The dye is preferably a dye that does not have ionic groups such as a carboxyl group, a sulfo group, a phosphate group, salts of the foregoing, and an ammonium group. Such a dye is not particularly limited, and may be, for example, a water-insoluble dye such as a disperse dye, or a dye in which an ionic group has been removed from a water-soluble dye.

The dye polymer is preferably a polymer having, in the main chain or a side chain, a structure derived from a dye having a xanthene skeleton. In such a polymer having, in a side chain, a structure derived from a dye having a xanthene skeleton, a polymer constituting the main chain is not particularly limited; however, this polymer is preferably an acrylic polymer, a urethane polymer, or a styrene polymer, more preferably an acrylic polymer or a urethane polymer, particularly preferably a urethane polymer. In such a polymer having, in the main chain, a structure derived from a dye having a xanthene skeleton, a polymer constituting the main chain is not particularly limited; however, this polymer is preferably a urethane polymer.

In the dye polymer, the method of introducing the structure derived from a dye having a xanthene skeleton is not limited. A monomer having a structure derived from a dye having a xanthene skeleton may be polymerized or copolymerized to obtain a polymer. Alternatively, after a polymer is formed, for example, a polymer reaction may be caused to introduce a structure derived from a dye having a xanthene skeleton.

Dye Polymer Having Structure Derived from Dye Having Xanthene Skeleton, and Having Main Chain Structure that is Acrylic Polymer In the present invention, an acrylic polymer is a polymer having at least one repeating unit species selected from the group consisting of repeating units derived from (meth)acrylic acid and repeating units derived from (meth)acrylic acid ester. Incidentally, "(meth)acrylic acid" represents at least one of acrylic acid and methacrylic acid, and "(meth)acrylic acid ester" represents at least one of acrylic acid ester and methacrylic acid ester.

The dye polymer having a structure derived from a dye having a xanthene skeleton, and having a main chain structure that is an acrylic polymer is preferably the following polymers, for example. In $L^1$, *1 represents a bonding point to a carbon atom of the polymer main chain; *2 represents a bonding point to Dye. In Dye, *3 represents a bonding point to $L^1$.

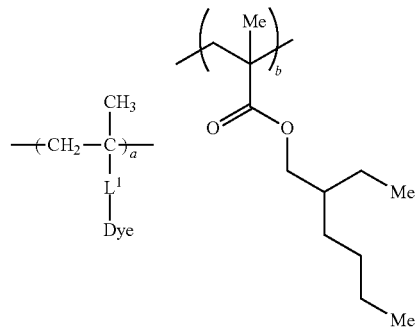

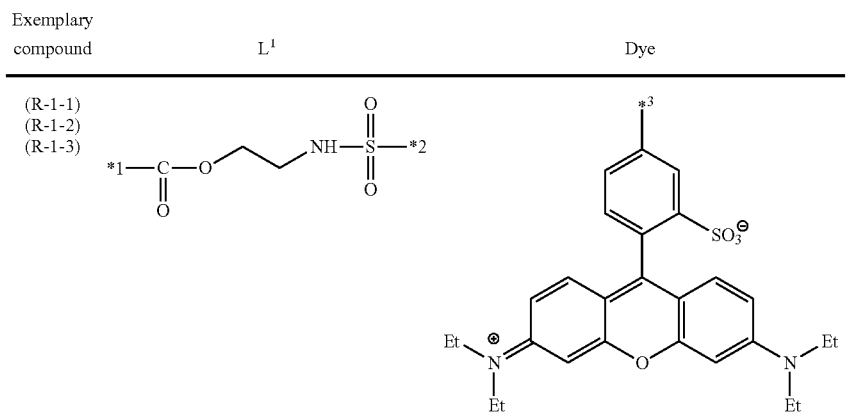

| Exemplary compound | $L^1$ | Dye |
|---|---|---|
| (R-1-1)<br>(R-1-2)<br>(R-1-3) | | |

| Exemplary compound | L¹ | Dye |
|---|---|---|
| (R-2-1) (R-2-2) | 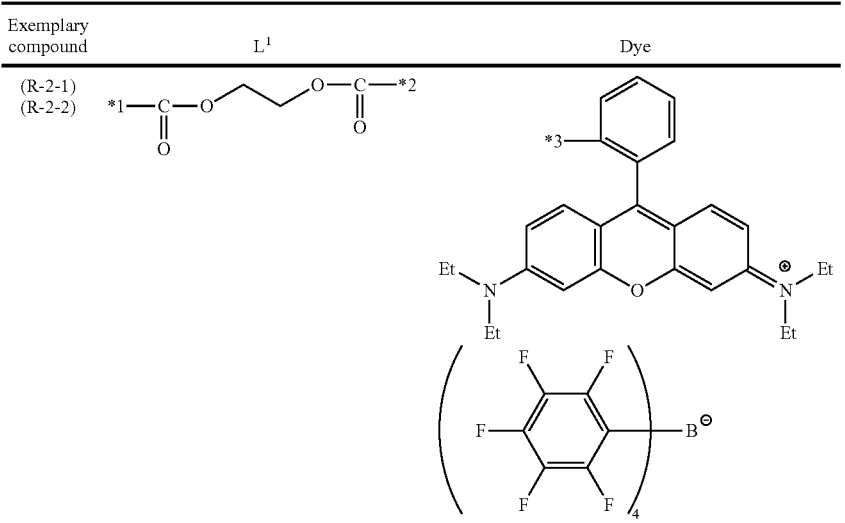 | |

| Exemplary compound | a mass % | b mass % | Weight-average molecular weight (Mw) | Dispersity (Mw/Mn) |
|---|---|---|---|---|
| (R-1-1) | 90 | 10 | 7,800 | 2.4 |
| (R-1-2) | 80 | 20 | 10,800 | 2.2 |
| (R-1-3) | 60 | 40 | 9,200 | 2.1 |
| (R-2-1) | 90 | 10 | 8,900 | 1.7 |
| (R-2-2) | 80 | 20 | 10,800 | 1.7 |

Dye Polymer having Structure Derived from Dye Having Xanthene Skeleton, and Having Urethane Bond In the present invention, a urethane polymer (also referred to as "polyurethane") is a polymer having a urethane bond, and is formed by a reaction between a polyol compound having two or more hydroxyl groups and a polyisocyanate compound having two or more isocyanate groups.

A dye polymer used in the present invention is preferably a dye polymer that has a structure derived from a dye having a xanthene skeleton, and that has a urethane bond (also referred to as "dye polymer having a urethane bond").

In general, the dye polymer having a urethane bond has a low Tg (glass transition point) and is soft, so that it has high conformability to textiles. Thus, the use of the dye polymer having a urethane bond inferentially enables improvements in the abrasion resistance and feeling of colored cloths after textile printing.

The dye polymer having a urethane bond may be a linear polymer having a main chain having a urethane bond, or a network polymer having a urethane bond.

Preferred examples of the dye polymer having a urethane bond include dye polymers having a repeating unit represented by the following general formula (1-2), and dye polymers having a repeating unit represented by the following general formula (1-3).

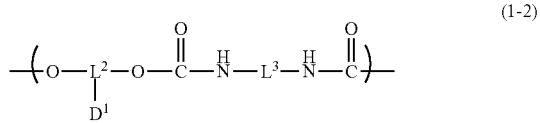 (1-2)

In the general formula (1-2), $L^2$ and $L^3$ each independently represent a linking group, and $D^1$ represents a dye residue in which any one hydrogen atom has been removed from a dye having a xanthene skeleton.

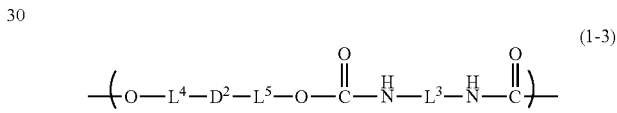 (1-3)

In the general formula (1-3), $L^3$ represents a linking group, $L^4$ and $L^5$ each independently represent a single bond or a linking group, and $D^2$ represents a dye residue in which any two hydrogen atoms have been removed from a dye having a xanthene skeleton.

In the general formula (1-2), $L^2$ and $L^3$ each independently represent a linking group. The linking group is not limited at all as long as advantages of the present invention are provided; however, the linking group is preferably a substituted or unsubstituted linear, branched, or cyclic aliphatic hydrocarbon group having 1 to 30 carbon atoms (may be a saturated aliphatic hydrocarbon group or may be an unsaturated aliphatic hydrocarbon group), a substituted or unsubstituted aromatic group having 6 to 30 carbon atoms (may be an aromatic hydrocarbon group, or may be an aromatic heterocyclic group), or a linking group of a combination of two or more of the foregoing. Such a linking group may have —O—, —S—, —NR— (where R represents a hydrogen atom, an alkyl group, an aryl group, or a heterocyclic group), —C(=O)—, —SO—, or —SO₂—, for example.

$L^2$ is preferably a trivalent linking group. $L^2$ preferably represents an aliphatic hydrocarbon group, more preferably an aliphatic hydrocarbon group having 1 to 10 carbon atoms.

$L^3$ is preferably a divalent linking group. $L^3$ is preferably an alkylene group, an arylene group, or a combination of the foregoing, more preferably an alkylene group, still more preferably an alkylene group having 1 to 10 carbon atoms.

$L^2$ and $L^3$ each represent a linking group that may have a substituent. The substituent may be a substituent selected from the group consisting of the Substituent group A.

In the general formula (1-2), $D^1$ is not limited as long as it is a dye residue in which any one hydrogen atom has been removed from a dye having a xanthene skeleton. However, $D^1$ preferably represents a dye residue in which any one hydrogen atom has been removed from a dye represented by a general formula (M1) below, more preferably represents a dye residue in which one hydrogen atom has been removed from $R^{203}$, $R^{204}$, $R^{207}$, $R^{208}$, or $R^{211}$ in the general formula (M1).

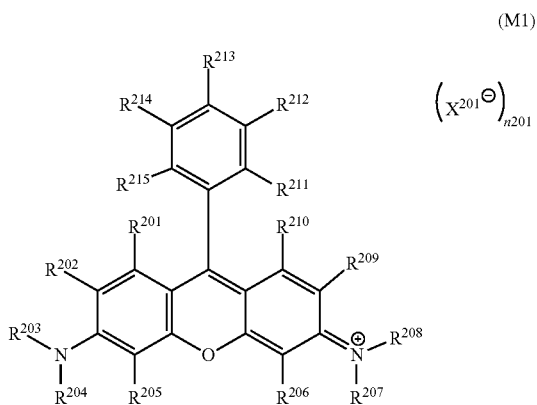

(M1)

In the general formula (M1), $R^{201}$ to $R^{215}$ each independently represent a hydrogen atom or a substituent, $X^{201}$ represents a monovalent anion, and n201 represents 0 or 1.

In the general formula (M1), when $R^{201}$ to $R^{215}$ represent substituents, examples of the substituents include substituents selected from the group consisting of the Substituent group A.

In the general formula $(M^1)$, when $R^{201}$ to $R^{215}$ represent substituents and these substituents can be further substituted, the substituents may further have a substituent, and the substituent may be a substituent selected from the group consisting of the above-described Substituent group A; when the substituents have two or more substituents, these substituents may be the same or different. In the general formula $(M^1)$, when $R^{201}$ to $R^{215}$ represent substituents, at least two of the substituents may join together to form a five-membered, six-membered, or seven-membered saturated ring or unsaturated ring. When the five-membered, six-membered, or seven-membered ring formed can be further substituted, it may further have a substituent, and the substituent may be a substituent selected from the group consisting of the above-described Substituent group A; when the ring is substituted with two or more substituents, these substituents may be the same or different.

In the general formula (M1), $R^{201}$, $R^{205}$, $R^{206}$, and $R^{210}$ preferably each independently represent a hydrogen atom, a halogen atom, or a hydroxyl group, more preferably a hydrogen atom.

In the general formula (M1), $R^{202}$ and $R^{209}$ preferably each independently represent a hydrogen atom, a halogen atom, a hydroxyl group, or a sulfo group, more preferably a hydrogen atom or a sulfo group, particularly preferably a hydrogen atom.

In the general formula (M1), $R^{203}$, $R^{204}$, $R^{207}$, and $R^{208}$ preferably each independently represent a hydrogen atom, a substituted or unsubstituted alkyl group having 1 to 20 carbon atoms, or a substituted or unsubstituted aryl group having 6 to 18 carbon atoms, more preferably a hydrogen atom, a substituted or unsubstituted alkyl group having 1 to 18 carbon atoms, or a substituted or unsubstituted aryl group having 6 to 10 carbon atoms, particularly preferably a hydrogen atom, a substituted or unsubstituted alkyl group having 2 to 12 carbon atoms, or a substituted or unsubstituted aryl group having 6 to 10 carbon atoms.

In the general formula (M1), $R^{211}$ preferably represents a carboxylate group ($-CO_2^-$), a sulfonate group ($-SO_3$), a substituted or unsubstituted alkoxycarbonyl group, a substituted or unsubstituted carbamoyl group, or a substituted or unsubstituted sulfamoyl group, more preferably, a sulfonate group, a substituted or unsubstituted alkoxycarbonyl group, a substituted or unsubstituted carbamoyl group, or a substituted or unsubstituted sulfamoyl group, particularly preferably a sulfonate group, or an alkoxycarbonyl group.

In the general formula (M1), $R^{212}$, $R^{213}$, $R^{214}$, and $R^{215}$ preferably each independently represent a hydrogen atom, a halogen atom, a substituted or unsubstituted alkyl group, a substituted or unsubstituted aryl group, a carboxyl group, a substituted or unsubstituted alkoxycarbonyl group, a substituted or unsubstituted carbamoyl group, a sulfo group, a substituted or unsubstituted sulfamoyl group, or a substituted or unsubstituted amino group, more preferably each independently represent a hydrogen atom, a halogen atom, a carboxyl group, a substituted or unsubstituted alkoxycarbonyl group, a substituted or unsubstituted carbamoyl group, a sulfo group, a substituted or unsubstituted sulfamoyl group, or a substituted or unsubstituted amino group, particularly preferably each independently represent a hydrogen atom, a substituted or unsubstituted alkoxycarbonyl group, a substituted or unsubstituted carbamoyl group, a sulfo group, a substituted or unsubstituted sulfamoyl group, or a substituted or unsubstituted amino group.

In the general formula (M1), $R^{214}$ and $R^{215}$ preferably join together to form a ring. In the general formula (M1), $X^{201}$ preferably represents a chloride ion, an acetate ion, a triflate ion, a tetrafluoroborate ion, a tetrakis(pentafluorophenyl)borate ion, a perchlorate ion, or a bis(trifluoromethanesulfonyl)imide anion, more preferably a tetrakis(pentafluorophenyl)borate ion, or a bis(trifluoromethanesulfonyl)imide anion.

In the general formula (M1), n201 represents 0 or 1, preferably 0.

In the general formula (1-3), $L^4$ and $L^5$ each independently represent a single bond or a linking group. The linking group is not limited at all as long as advantages of the present invention are provided. However, the linking group is preferably a substituted or unsubstituted linear, branched, or cyclic alkylene group having 1 to 30 carbon atoms (for example, a methylene group, an ethylene group, a trimethylene group, a propylene group, or a butylene group), a substituted or unsubstituted arylene group having 6 to 30 carbon atoms (for example, a phenylene group, or a naphthalene group), a substituted or unsubstituted heterocyclic group, $-CH=CH-$, or a linking group of a combination of two or more of the foregoing. Such a linking group may have $-O-$, $-S-$, $-NR-$ (where R represents a hydrogen atom, an alkyl group, an aryl group, or a heterocyclic group), $-C(=O)-$, $-SO-$, or $-SO_2-$, for example.

$L^4$ and $L^5$ are preferably divalent linking groups. $L^4$ and $L^5$ are preferably alkylene groups, more preferably alkylene groups having 1 to 10 carbon atoms, still more preferably alkylene groups having 1 to 6 carbon atoms.

$L^3$ is the same as $L^3$ in the above-described general formula (1-2).

When $L^3$, $L^4$, and $L^5$ represent linking groups, such a linking group may have a substituent, and the substituent may be a substituent selected from the group consisting of the Substituent group A.

In the general formula (1-3), $D^2$, which represents a dye residue in which any two hydrogen atoms have been removed from a dye having a xanthene skeleton, is not particularly limited, but preferably represents a dye residue in which any two hydrogen atoms have been removed from the dye represented by the above-described general formula (M1), more preferably represents a dye residue in which, in the general formula ($M^1$), one hydrogen atom has been removed from each of two selected from the group consisting of $R^{203}$, $R^{204}$, $R^{207}$, and $R^{208}$, in total, two hydrogen atoms. The description about the general formula (M1) is the same as above.

The dye polymer having a urethane bond preferably has a weight-average molecular weight (Mw) of 2,000 to 2,000,000, more preferably 2,000 to 1,000,000, still more preferably 3,000 to 80,000, particularly preferably 3,000 to 60,000, most preferably 5,000 to 30,000.

The dye polymer having a urethane bond preferably has a dispersity (Mw/Mn) of 1.0 to 20.0, more preferably 1.0 to 10.0, still more preferably 1.0 to 5.0, particularly preferably 1.0 to 3.0. Mn represents number-average molecular weight.

The weight-average molecular weight of the dye polymer having a urethane bond can be calculated by gel permeation chromatography (GPC) measurement. In this Specification, unless otherwise specified, GPC was performed such that HLC-8220GPC (manufactured by Tosoh Corporation) was used with columns of TSKgel SuperAW4000, TSKgel SuperAW3000, and TSKgel SuperAW2500 (manufactured by Tosoh Corporation); and the number-average molecular weight was calculated as polymethyl-methacrylate-equivalent molecular weight. The carrier may be appropriately selected; as long as dissolution was achieved, a trifluoroethanol solution of 5 mmol/L sodium trifluoroacetate was used.

The dye polymer having a urethane bond preferably contains, relative to all the repeating units, a repeating unit represented by the above-described general formula (1-2) or (1-3) in an amount of 34 to 96 mass %, more preferably 24 to 91 mass %, still more preferably 57 to 91 mass %.

The dye polymer having a urethane bond may have another repeating unit. The other repeating unit is preferably a repeating unit including an acidic group. The acidic group is, in particular, preferably —COOM (where M represents a hydrogen atom or a counter cation). —COOM represents a carboxyl group (when M represents a hydrogen atom) or a salt of a carboxyl group (when M represents a counter cation). When M represents a counter cation, examples thereof include an ammonium ion, an alkali metal ion (for example, a lithium ion, a sodium ion, or a potassium ion), and an organic cation (for example, a tetramethylammonium ion, a tetramethylguanidinium ion, a tetramethylphosphonium ion, or a tetrabutylammonium ion), preferably a lithium ion, a sodium ion, a potassium ion, or an ammonium ion, more preferably a lithium ion or a sodium ion.

The repeating unit having —COOM is preferably a repeating unit represented by the following general formula (Z).

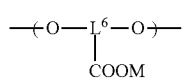

(Z)

In the general formula (Z), $L^6$ represents a linking group. M represents a hydrogen atom or a counter cation.

In the general formula (Z), the linking group represented by $L^6$ is preferably a substituted or unsubstituted linear, branched, or cyclic aliphatic hydrocarbon group having 1 to 30 carbon atoms (may be a saturated aliphatic hydrocarbon group or may be an unsaturated aliphatic hydrocarbon group), a substituted or unsubstituted aromatic group having 6 to 30 carbon atoms (may be an aromatic hydrocarbon group or may be an aromatic heterocyclic group), or a linking group of a combination of two or more of the foregoing. Such a linking group may have —O—, —S—, —NR— (where R represents a hydrogen atom, an alkyl group, an aryl group, or a heterocyclic group), —C(=O)—, —SO—, or —SO$_2$—, for example.

$L^6$ is preferably a trivalent linking group. $L^6$ is preferably an aliphatic hydrocarbon group or a linking group of a combination of an aliphatic hydrocarbon group and —O—. The aliphatic hydrocarbon group is preferably an aliphatic hydrocarbon group having 1 to 10 carbon atoms, more preferably an aliphatic hydrocarbon group having 1 to 6 carbon atoms.

The linking group represented by $L^6$ may have a substituent, and the substituent may be a substituent selected from the group consisting of the Substituent group A.

The dye polymer preferably contains, relative to all the repeating units, the repeating unit including an acidic group in a ratio of 1 to 29 mass %, more preferably 2 to 24 mass %, particularly preferably 2 to 19 mass %. When the content ratio of the repeating unit including an acidic group (preferably —COOM) is 1 mass % or more, the dye polymer in the ink has improved dispersity. When the content ratio is 29 mass % or less, the average particle size is easily controlled.

The dye polymer having a urethane bond may have a hydroxyl group, and may have the hydroxyl group in the structure derived from a dye having a xanthene skeleton.

Method for Producing Dye Polymer having Urethane Bond

The dye polymer having a urethane bond is preferably produced by a polyaddition reaction between a compound (monomer) having a structure derived from a dye having a xanthene skeleton, and having two or more hydroxyl groups, and a compound (monomer) having two or more isocyanate groups (—NCO).

The compound having a structure derived from a dye having a xanthene skeleton, and having two or more hydroxyl groups is preferably a compound having two to four hydroxyl groups. In other words, the dye polymer having a urethane bond preferably includes a structure derived from a compound having a structure derived from a dye having a xanthene skeleton, and having two to four hydroxyl groups.

The compound having a structure derived from a dye having a xanthene skeleton, and having two or more hydroxyl groups is preferably, for example, a compound represented by a general formula (M10) or (M12), or a general formula (M13) below.

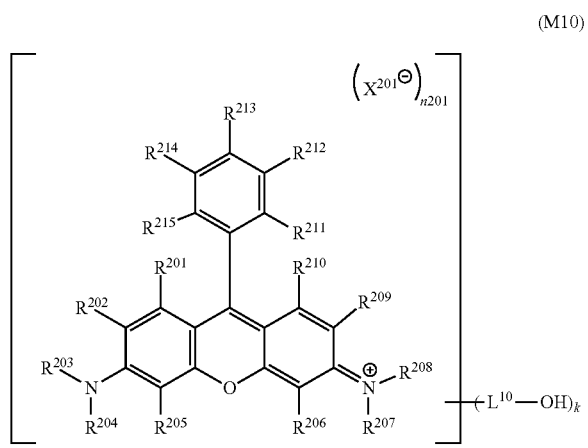

(M10)

In the general formula (M10), $R^{201}$ to $R^{215}$ each independently represent a hydrogen atom or a substituent, $X^{201}$ represents a monovalent anion, and n201 represents 0 or 1. $L^{10}$ represents a linking group. Among $R^{201}$ to $R^{215}$, k R's are substituted with -$L^{10}$-OH where k represents 3 or 4.

In the general formula (M10), $R^{201}$ to $R^{215}$ are the same as $R^{201}$ to $R^{215}$ in the above-described general formula (M1).

In the general formula (M10), $L^{10}$ is the same as $L^4$ in the above-described general formula (1-3).

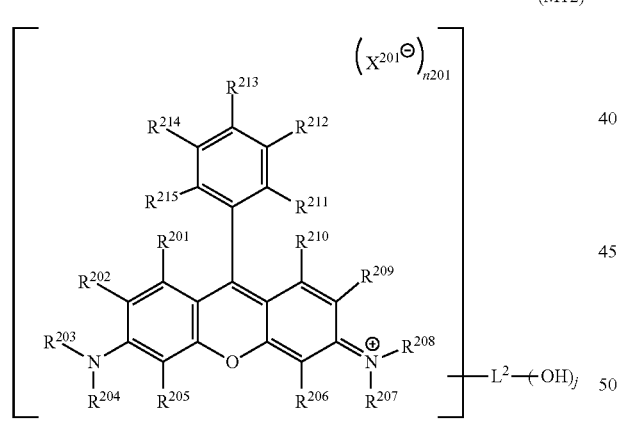

(M12)

In the general formula (M12), $R^{201}$ to $R^{215}$ each independently represent a hydrogen atom or a substituent, $X^{201}$ represents a monovalent anion, and n201 represents 0 or 1. $L^2$ represents a linking group. Any one of $R^{201}$ to $R^{215}$ is substituted with -$L^2$-(OH)$_j$ where j represents an integer of 2 or more.

In the general formula (M12), $R^{201}$ to $R^{215}$ are the same as $R^{201}$ to $R^{215}$ in the above-described general formula (M1).

In the general formula (M12), $L^2$ is the same as $L^2$ in the above-described general formula (1-2).

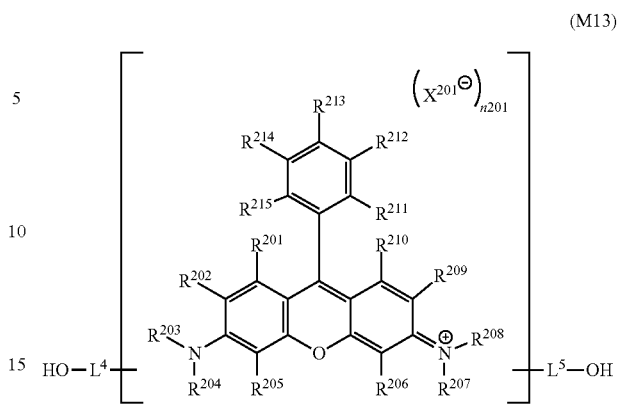

(M13)

In the general formula (M13), $R^{201}$ to $R^{215}$ each independently represent a hydrogen atom or a substituent, $X^{201}$ represents a monovalent anion, and n201 represents 0 or 1. $L^4$ and $L^5$ each independently represent a single bond or a linking group. Any one of $R^{201}$ to $R^{215}$ is substituted with -$L^4$-OH, and another one of $R^{201}$ to $R^{215}$ is substituted with -$L^5$-OH.

In the general formula (M13), $R^{201}$ to $R^{215}$ are the same as $R^{201}$ to $R^{215}$ in the above-described general formula (M1).

In the general formula (M13), $L^4$ and $L^5$ are the same as $L^4$ and $L^5$ in the above-described general formula (1-3).

The compounds (monomers) represented by the general formula (M10) or (M12), or the general formula (M13) can be synthesized with reference to, for example, US2014/176653A1, 2014; Journal of the American Chemical Society, 1924, vol. 46, p. 1899; or Journal of the Chemical Society, 1922, vol. 121, p. 2390.

Specific examples of the compound having a structure derived from a dye having a xanthene skeleton, and having two or more hydroxyl groups are as follows; however, these are not limiting.

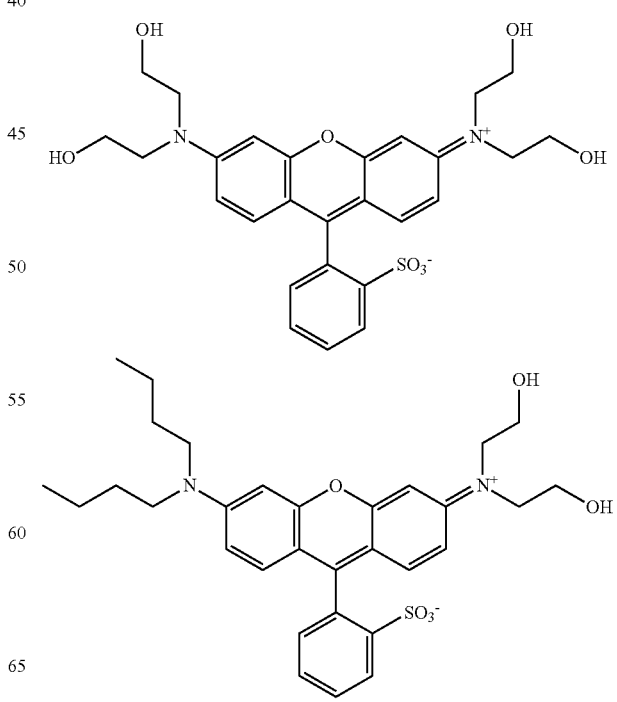

-continued
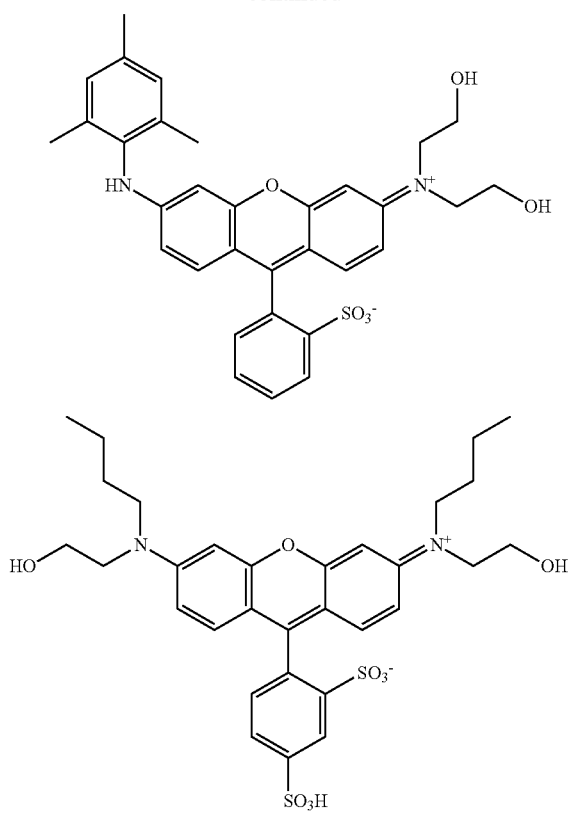
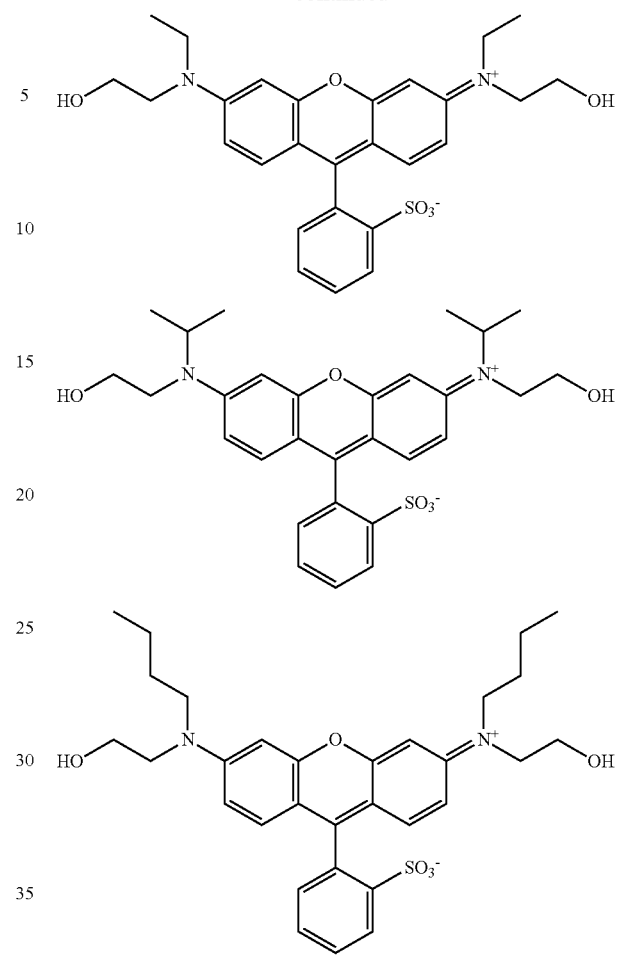
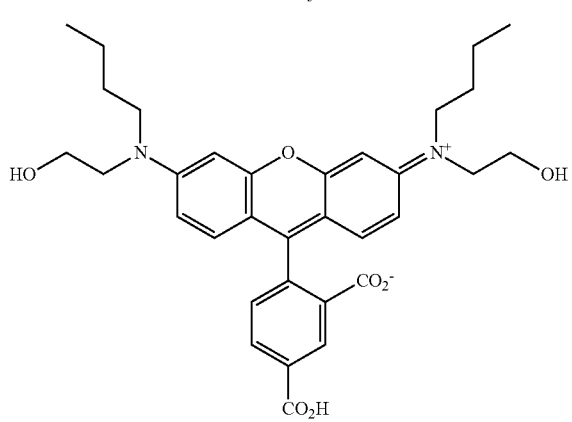
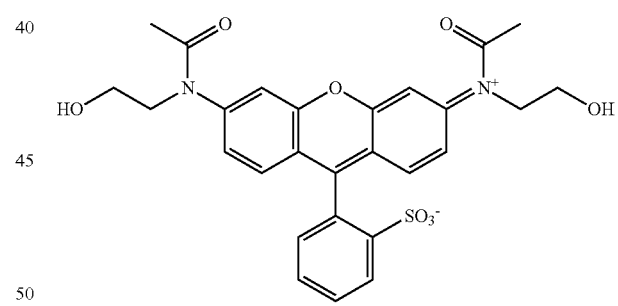
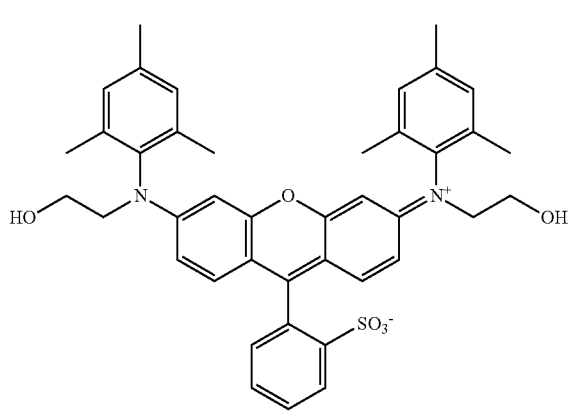
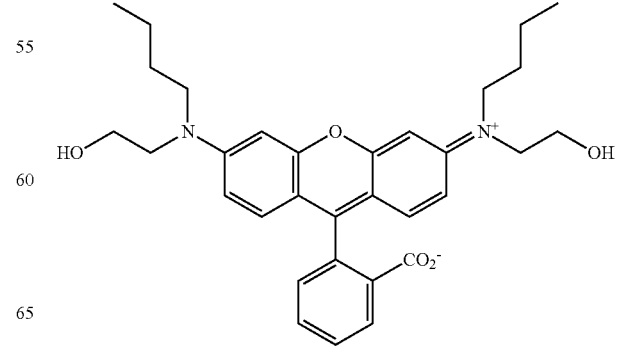

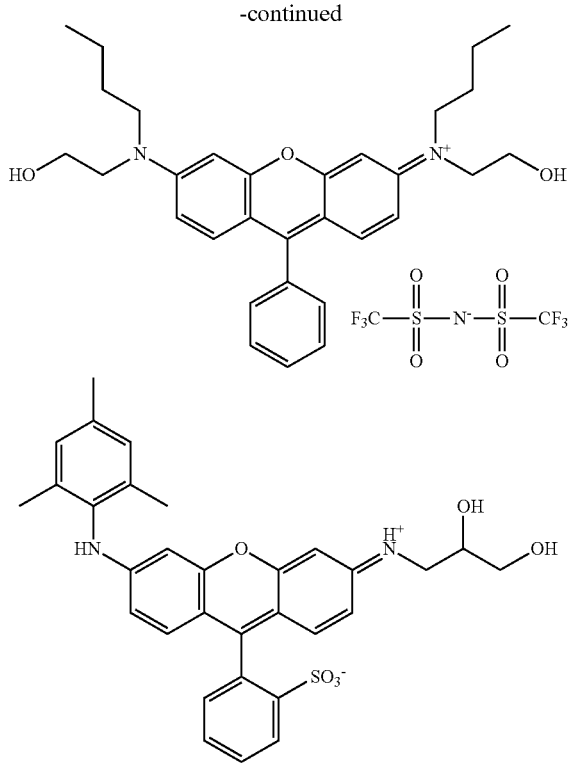

Compound Having Two or More Isocyanate Groups

The compound having two or more isocyanate groups (—NCO) is preferably a compound represented by the following general formula (J).

$$O=C=N-L^3-N=C=O \quad (J)$$

In the general formula (J), $L^3$ represents a linking group.

In the general formula (J), $L^3$ is the same as $L^3$ in the above-described general formulas (1-2) and (1-3).

In order to introduce the repeating unit represented by the above-described general formula (Z), a compound (monomer) represented by the following general formula (MZ) can be added as a raw material for producing the dye polymer having a urethane bond, to cause a polyaddition reaction with the compound (monomer) having two or more isocyanate groups.

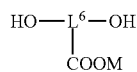

(MZ)

In the general formula (MZ), $L^6$ represents a linking group. M represents a hydrogen atom or a counter cation.

In the general formula (MZ), $L^6$ and M are the same as $L^6$ and M in the above-described general formula (Z).

The dye polymer having a urethane bond preferably contains, relative to all the structural units, a structural unit derived from the compound having a structure derived from a dye having a xanthene skeleton, and having two or more hydroxyl groups, in an amount of 27 to 77 mass %, more preferably 36 to 73 mass %, still more preferably 44 to 73 mass %.

The dye polymer having a urethane bond preferably contains, relative to all the structural units, a structural unit derived from the compound having two or more isocyanate groups, in an amount of 23 to 44 mass %, more preferably 24 to 40 mass %, still more preferably 24 to 37 mass %.

Preferred specific examples of the dye polymer having a urethane bond will be described below; however, these are not limiting. Incidentally, in the following specific examples, dye polymers having a urethane bond are described, with the structures of monomers, as polymers having individual percentages of structural units derived from the monomers.

| Exemplary compound | a mass % | b mass % | c mass % | M | Weight-average molecular weight (Mw) | Dispersity (Mw/Mn) |
|---|---|---|---|---|---|---|
| (D-1-1) | 58 | 42 | 0 | H | 9,800 | 16.4 |
| (D-1-2) | 55 | 43 | 2 | H | 12,100 | 8.2 |
| (D-1-3) | 51 | 44 | 5 | H | 13,500 | 4.5 |
| (D-1-4) | 49 | 44 | 7 | H | 11,200 | 3.5 |
| (D-1-5) | 45 | 45 | 10 | H | 12,500 | 3.0 |
| (D-1-6) | 40 | 46 | 14 | H | 14,200 | 4.3 |
| (D-1-7) | 33 | 48 | 19 | H | 12,200 | 9.8 |
| (D-1-8) | 27 | 49 | 24 | H | 11,800 | 14.2 |
| (D-1-9) | 20 | 51 | 29 | H | 13,500 | 19.1 |

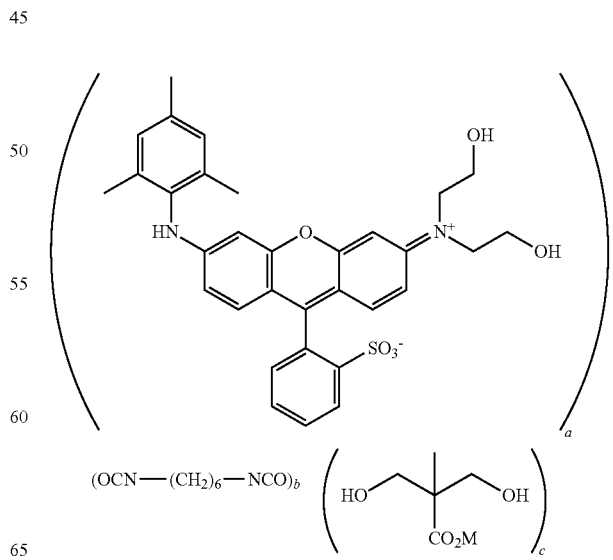

| Exemplary compound | a mass % | b mass % | c mass % | Weight-average molecular weight (Mw) | M | Dispersity (Mw/Mn) |
|---|---|---|---|---|---|---|
| (D-2-1) | 77 | 23 | 0 | 10,500 | H | 6.1 |
| (D-2-2) | 73 | 24 | 3 | 9,900 | H | 5.5 |
| (D-2-3) | 68 | 27 | 5 | 11,600 | H | 3.8 |
| (D-2-4) | 65 | 28 | 7 | 13,200 | H | 3.5 |
| (D-2-5) | 60 | 30 | 10 | 12,700 | H | 2.9 |
| (D-2-6) | 53 | 33 | 14 | 11,900 | H | 3.7 |
| (D-2-7) | 44 | 37 | 19 | 12,200 | H | 6.9 |
| (D-2-8) | 36 | 40 | 24 | 9,600 | H | 9.2 |
| (D-2-9) | 27 | 44 | 29 | 11,400 | H | 12.4 |
| (D-2-10) | 60 | 30 | 10 | 2,400 | H | 5.8 |
| (D-2-11) | 60 | 30 | 10 | 3,700 | H | 4.9 |
| (D-2-12) | 60 | 30 | 10 | 5,400 | H | 4.4 |
| (D-2-13) | 60 | 30 | 10 | 27,800 | H | 3.2 |
| (D-2-14) | 60 | 30 | 10 | 53,900 | H | 8.6 |
| (D-2-15) | 60 | 30 | 10 | 78,200 | H | 11.4 |
| (D-2-16) | 60 | 30 | 10 | 152,800 | H | 19.2 |
| (D-2-17) | 60 | 30 | 10 | 214,400 | H | 20.0 |
| (D-2-18) | 60 | 30 | 10 | 12,300 | Na | 3.4 |
| (D-2-19) | 60 | 30 | 10 | 12,700 | K | 3.7 |

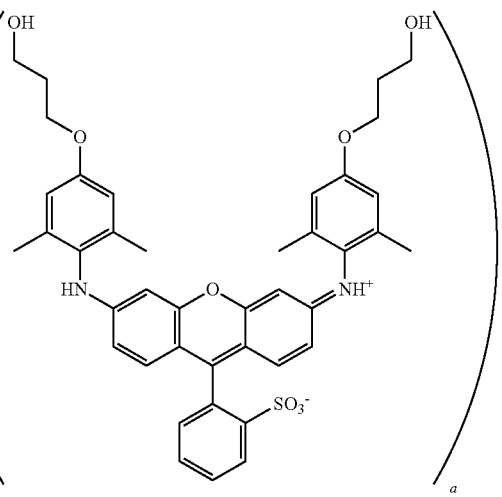

| Exemplary compound | a mass % | b mass % | c mass % | Weight-average molecular weight (Mw) | M | Dispersity (Mw/Mn) |
|---|---|---|---|---|---|---|
| (D-3-1) | 53 | 37 | 10 | 9,400 | H | 10.4 |
| (D-3-2) | 53 | 37 | 10 | 13,100 | H | 4.3 |
| (D-3-3) | 53 | 37 | 10 | 12,600 | Na | 2.8 |
| (D-3-4) | 53 | 37 | 10 | 17,200 | H | 3.7 |
| (D-3-5) | 53 | 37 | 10 | 35,900 | H | 8.2 |
| (D-3-6) | 53 | 37 | 10 | 74,100 | H | 17.4 |

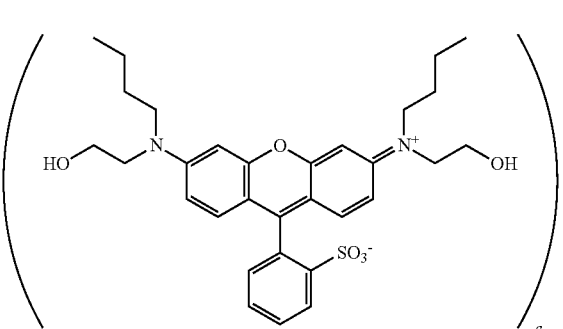

| Exemplary compound | a mass % | b mass % | c mass % | Weight-average molecular weight (Mw) | M | Dispersity (Mw/Mn) |
|---|---|---|---|---|---|---|
| (D-4-1) | 63 | 27 | 10 | 3,200 | H | 4.7 |
| (D-4-2) | 63 | 27 | 10 | 13,100 | Na | 5.9 |
| (D-4-3) | 63 | 27 | 10 | 12,600 | K | 4.6 |
| (D-4-4) | 63 | 27 | 10 | 14,200 | Li | 4.3 |
| (D-4-5) | 63 | 27 | 10 | 29,300 | H | 8.2 |
| (D-4-6) | 63 | 27 | 10 | 32,100 | H | 15.2 |

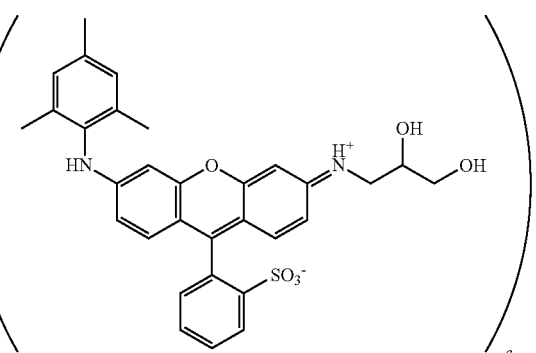

| Exemplary compound | a mass % | b mass % | c mass % | Weight-average molecular weight (Mw) | M | Dispersity (Mw/Mn) |
|---|---|---|---|---|---|---|
| (D-5-1) | 60 | 30 | 10 | 2,700 | H | 4.7 |
| (D-5-2) | 60 | 30 | 10 | 10,200 | Na | 5.9 |
| (D-5-3) | 60 | 30 | 10 | 15,300 | K | 4.6 |
| (D-5-4) | 60 | 30 | 10 | 19,200 | Li | 4.3 |
| (D-5-5) | 60 | 30 | 10 | 35,300 | H | 9.2 |
| (D-5-6) | 60 | 30 | 10 | 57,200 | H | 15.2 |

Aqueous Dispersion of Dye Polymer

The aqueous dispersion of the dye polymer at least includes water and a (A) dye polymer, preferably contains a (B) aqueous organic solvent. Depending on the method of producing the aqueous dispersion of the dye polymer, a (C) low-molecular surfactant or high-molecular dispersing agent may be additionally used, or may not be additionally used (what is called, self-dispersion).

(A) Dye Polymer

In the present invention, the above-described dye polymer is used not in a state of being dissolved in water, but in a state of being dispersed in water (aqueous dispersion).

Unlike the state of being dissolved in water, the dye polymer in the state of being dispersed in water is a polymer substantially insoluble in water, so that it provides high water resistance such as washing resistance and perspiration resistance. The present invention does not require, after printing, the washing step using water, hence the dye polymer used is a polymer substantially insoluble in water. In an aqueous dispersion according to the present invention, the polymer insoluble in water is preferably dispersed as particles having a particle size of 30 to 500 nm. When the polymer dissolves in water, the polymer in water does not have the form of particles.

Such dye polymers may be used alone or in combination of two or more thereof mixed in a desired ratio.

The water is preferably ultrapure water.

(1-1) Dispersity

While the dye polymer is dispersed in water, due to the properties of the dye polymer itself or adsorption onto the low-molecular surfactant or high-molecular dispersing agent additionally used, the dye polymer is hydrophilic (highly wettable), and has a function of, due to electrostatic repulsion (repulsive force) or steric repulsion, preventing reaggregation of fine particles of the dye polymer, and suppressing generation of sediment.

(1-2) Average Particle Size

The dye polymer has the form of particles in the aqueous dispersion. The particulate dye polymer in the aqueous dispersion of the dye polymer preferably has an average particle size of 30 to 500 nm, more preferably 30 to 400 nm, still more preferably 30 to 200 nm, particularly preferably 40 to 100 nm. When such a range is satisfied, direct printing on textiles by an inkjet method can be performed.

In this Specification, the average particle sizes are values measured with a particle size distribution analyzer (Nanotrac UPA EX150, manufactured by NIKKISO CO., LTD., trade name).

The aqueous dispersion preferably has a dye polymer content of 0.1 to 40 mass %, more preferably 1 to 30 mass %, particularly preferably 3 to 25 mass %. When such a range is satisfied, the storage stability of the inkjet ink is ensured, and the printing provides deeply dyed cloths.

The aqueous dispersion preferably has a water content of 50 to 95 mass %, more preferably 55 to 90 mass %, particularly preferably 60 to 90 mass %. When such a range is satisfied, the stability of the aqueous dispersion and the ejection stability of the inkjet ink can be imparted. Incidentally, the stability of the aqueous dispersion means resistance to occurrence of sedimentation, for example.

(B) Aqueous Organic Solvent

The aqueous organic solvent preferably has an aqueous solubility at 25° C. of 10 g/100 g-$H_2O$ or more, more preferably 20 g/100 g-$H_2O$, particularly preferably is miscible with water in a desired ratio. Examples of the aqueous organic solvent include alcohol-based solvents, amide-based solvents, and nitrile-based solvents. Examples include methanol, ethanol, n-propanol, isopropanol, n-butanol, isobutanol, tert-butanol, trimethylolpropane, ethylene glycol, diethylene glycol, triethylene glycol, polyethylene glycol, propylene glycol, butylene glycol, 1,2,6-hexanetriol, thioglycol, hexylene glycol, glycerol, diglycerol, 2-pyrrolidone, N-methyl-2-pyrrolidone, 1,5-pentanediol, 1,6-hexanediol, ethylene glycol monoethyl ether, ethylene glycol monobutyl ether, and acetonitrile. Preferred are trimethylolpropane, ethylene glycol, diethylene glycol, triethylene glycol, propylene glycol, glycerol, 2-pyrrolidone, 1,5-pentanediol, 1,6-hexanediol, and ethylene glycol monobutyl ether; more preferred are ethylene glycol, diethylene glycol, triethylene glycol, propylene glycol, glycerol, 2-pyrrolidone, and ethylene glycol monobutyl ether; and particularly preferred are ethylene glycol, glycerol, and 2-pyrrolidone.

The aqueous dispersion preferably has an aqueous organic solvent content of 5 to 50 mass %, more preferably 5 to 40 mass %, particularly preferably 10 to 30 mass %. When such a range is satisfied, the stability of the aqueous dispersion and the ejection stability of the inkjet ink can be imparted.

(C) Low-Molecular Surfactant or High-Molecular Dispersing Agent

The low-molecular surfactant or high-molecular dispersing agent is preferably a low-molecular surfactant or high-molecular dispersing agent having a hydrophobic group and an ionic group, and having the following characteristics.

(2-1) Dispersity

The low-molecular surfactant or high-molecular dispersing agent has functions of, by being added during dispersion of the dye polymer, adsorbing onto the surface of the dye polymer to make the dye polymer hydrophilic (wet), and preventing reaggregation of dye polymer fine particles provided by mechanical grinding due to electrostatic repulsion (repulsive force) or steric repulsion, to suppress generation of sediment.

(2-2) Molecular Weight

In the case of the high-molecular dispersing agent, a certain molecular weight is optimal for providing the dispersion effect on the dye polymer. When the dispersing agent is large beyond this molecular weight, it causes crosslinking between the dye polymer and the dye polymer, which results in aggregation of the dye polymers. On the other hand, when the dispersing agent has a molecular weight less than the optimal one, it tends to desorb from the dye polymer, so that the effect of the dispersing agent weakens. In addition, when the molecular weight is low, the effect provided by serving as the fixing agent after crosslinking weakens. Thus, the high-molecular dispersing agent preferably has a weight-average molecular weight of 2,000 to 50,000. The weight-average molecular weight of the high-molecular dispersing agent is measured by the same method as in the weight-average molecular weight of the dye polymer.

(2-3) Structure and Form

The low-molecular surfactant or high-molecular dispersing agent preferably has a hydrophobic group (electrically neutral nonpolar group having low affinity for water) and an ionic group (electrically ionic polar group having high affinity for water). This structure may be linear or branched. In the case of a high-molecular surfactant, it may have any of a random structure, an alternating structure, a periodic structure, and a block structure, or may be a graft polymer designed so as to have the structure of a main chain and side chains.

The low-molecular surfactant or high-molecular dispersing agent in a state of being added to water or an aqueous organic solvent may have any of the forms of an aqueous solution, a dispersion, and an emulsion.

(2-4) Method of Formation and Method of Acquisition

Examples of the low-molecular surfactant include the following.

Examples of cationic surfactants include aliphatic amine salts, aliphatic quaternary ammonium salts, benzalkonium salts, benzethonium chloride, pyridinium salts, and imidazolinium salts. Examples of anionic surfactants include fatty acid soap (for example, sodium oleate), N-acylglutamic acid salts, alkylsulfonic acid salts, alkylbenzenesulfonic acid salts, alkylsulfoacetic acid salts, sulfonated oil, higher alcohol sulfuric acid ester salts, and alkylphosphoric acid ester salts. Examples of amphoteric surfactants include carboxybetaine-based surfactants, sulfobetaine-based surfactants, aminocarboxylic acid salts, and imidazolinium betaine. Other preferred examples include amine oxide-based surfactants such as N,N-dimethyl-N-alkylamine oxide.

Examples of nonionic surfactants include polyoxyethylene alkyl ethers, polyoxyethylene lanoline derivatives, polyoxyethylene polyoxypropylene alkyl ethers, polyoxyethylene glycerol fatty acid esters, polyethylene glycol fatty acid esters, polyglycerol fatty acid esters, sorbitan fatty acid esters, propylene glycol fatty acid esters, and acetylene glycol. Other preferred examples include SURFYNOLS (Air Products & Chemicals, Inc.), which are acetylene-based polyoxyethylene oxide surfactants. Other examples include surfactants described in JP1984-157636A (JP-S59-157636A), pages (37) to (38), and Research Disclosure No. 308119 (1989).

The low-molecular surfactant content relative to the total mass of the aqueous dispersion is preferably in the range of 0.001 mass % to 5.0 mass %. Adjustment is preferably performed within this range to provide the aqueous dispersion that exhibits a desired surface tension.

The high-molecular dispersing agent can be produced by copolymerizing a hydrophobic group-containing monomer and an ionic group-containing monomer. Each of these monomers may be a single monomer species or two or more monomer species. The hydrophobic group-containing monomer and the ionic group-containing monomer are the same as the monomers of copolymerization components of the above-described dye polymer. The high-molecular dispersing agent may be DISPERBYK-194N (trade name) manufactured by BYK Japan KK, for example.

The high-molecular dispersing agent content relative to the total mass of the aqueous dispersion is preferably in the range of 0.001 mass % to 50 mass %. Adjustment is preferably performed within this range to provide the aqueous dispersion that exhibits a desired surface tension.

The method for producing the aqueous dispersion of the dye polymer is preferably (A) a method in which powder or paste of the dye polymer, and, as needed, a low-molecular surfactant or high-molecular dispersing agent are mixed in water or an aqueous organic solvent, and subsequently treated together with, for example, glass beads, zirconia beads, titania beads, or stainless steel balls in an attritor or a milling machine to form a fine dispersion; or (B) a method in which water or an aqueous organic solvent, a polymerizable dye monomer slightly soluble in water or an aqueous organic solvent, and, as needed, a copolymerization monomer and an emulsifying agent (surfactant) are mixed, and, to the resultant mixture, a polymerization initiator (normally, a radical generator) soluble in water or an aqueous organic solvent is added, to cause emulsion polymerization.

Such a dispersion may be prepared so as to contain, as needed, as a wetting agent, a glycol solvent such as ethylene glycol, propylene glycol, diethylene glycol, glycerol, or polyethylene glycol, urea, hyaluronic acid, or sucrose, for example. In addition, the above-described nonionic surfactant or anionic surfactant may be added as a dispersing aid; however, such a surfactant is preferably added in a small amount so as not to degrade the performance of dispersion stability.

Coloring Composition

The present invention also relates to a coloring composition including an aqueous dispersion of a dye polymer. The coloring composition including an aqueous dispersion of a dye polymer contains the above-described aqueous dispersion of a dye polymer, preferably further contains water or an aqueous organic solvent. The coloring composition may further contain, as needed, components such as other coloring agents, organic solvents, surfactants, and various additives.

A coloring composition according to the present invention is a dispersion liquid in which the dye polymer is dispersed in a liquid including water. Incidentally, in the coloring composition, the dye polymer takes a particulate form; the preferred average particle size of the particulate dye polymer is the same as above.

A coloring composition containing an aqueous dispersion of a dye polymer according to the present invention has high light resistance, and hence is applicable not only to fiber dyeing, but also to paper medium dyeing, plastic dyeing, coating materials, coating films, and construction materials.

A coloring composition according to the present invention may further include, in addition to the dye polymer, another coloring agent (for example, a dye or a pigment). When such another coloring agent is included, the dye polymer content relative to the total mass of the coloring agents including the dye polymer is preferably 50 mass % or more, more preferably 80 mass % or more, still more preferably 100 mass %, in other words, the dye polymer alone is contained.

In consideration of performing dyeing with appropriate depth of color, and preservation stability of the coloring composition, the amount of coloring agents (including the dye polymer and another coloring agent) contained in the coloring composition relative to the total mass of the coloring composition is preferably 0.1 mass % to 20 mass %, more preferably 1 mass % to 15 mass %, still more preferably 3 mass % to 12 mass %.

The dye polymer content of the coloring composition is preferably 0.1 mass % to 20 mass %, more preferably 1 mass % to 15 mass %.

The water content of the coloring composition is preferably 40 mass % to 90 mass %, more preferably 50 mass % to 85 mass %, still more preferably 50 mass % to 80 mass %.

The method of preparing the coloring composition is not particularly limited. For example, the aqueous dispersion of the dye polymer and, as needed, water or another component may be mixed to prepare the coloring composition.

Organic Solvent

Examples of the organic solvent that may be contained in a coloring composition according to the present invention include polyhydric alcohols (for example, ethylene glycol, glycerol, 2-ethyl-2-(hydroxymethyl)-1,3-propanediol, tetraethylene glycol, triethylene glycol, tripropylene glycol, 1,2,4-butanetriol, diethylene glycol, propylene glycol, dipropylene glycol, butylene glycol, 1,6-hexanediol, 1,2-hexanediol, 1,5-pentanediol, 1,2-pentanediol, 2,2-dimethyl-1,3-propanediol, 1,2-butanediol, 2-methyl-2,4-pentanediol, 3-methyl-1,5-pentanediol, 3-methyl-1,3-butanediol, and 2-methyl-1,3-propanediol), amines (for example, ethanolamine, and 2-(dimethylamino)ethanol), monohydric alcohols (for example, methanol, ethanol, and butanol), alkyl ethers of polyhydric alcohols (for example, diethylene glycol monomethyl ether, diethylene glycol monobutyl ether, triethylene glycol monomethyl ether, triethylene glycol monobutyl ether, ethylene glycol monomethyl ether, ethylene glycol monobutyl ether, propylene glycol monomethyl ether, propylene glycol monobutyl ether, and dipropylene glycol monomethyl ether), 2,2'-thiodiethanol, amides (for example, N,N-dimethylformamide), sulfur-containing compounds such as sulfolane, dimethyl sulfoxide, and 3-sulfolene, heterocycles (for example, 2-pyrrolidone, N-methyl-2-pyrrolidone, 1,3-dimethyl-2-imidazolidinone, and N-ethylmorpholine), and acetonitrile. These may be used alone or in combination of two or more thereof.

The organic solvent that may be contained in a coloring composition according to the present invention is preferably the above-described aqueous organic solvent.

The organic solvent content of a coloring composition according to the present invention relative to the total mass of the coloring composition is preferably 1 mass % to 60 mass %, more preferably 2 mass % to 50 mass %.

Surfactant

From the viewpoint of improving, for example, preservation stability, ejection stability, and ejection accuracy, a coloring composition according to the present invention may further include various surfactants. Such surfactants may be cationic, anionic, amphoteric, or nonionic surfactants.

Examples of cationic surfactants include aliphatic amine salts, aliphatic quaternary ammonium salts, benzalkonium salts, benzethonium chloride, pyridinium salts, and imidazolinium salts.

Examples of the anionic surfactants include fatty acid soap, N-acylglutamic acid salts, alkylsulfonic acid salts, alkylbenzenesulfonic acid salts, alkylsulfoacetic acid salts, sulfonated oil, higher alcohol sulfuric acid ester salts, and alkylphosphoric acid ester salts.

Examples of amphoteric surfactants include carboxybetaine-based surfactants, sulfobetaine-based surfactants, aminocarboxylic acid salts, and imidazolinium betaine. Other preferred examples include amine oxide-based surfactants such as N,N-dimethyl-N-alkylamine oxide.

Examples of nonionic surfactants include polyoxyethylene alkyl ethers, polyoxyethylene lanoline derivatives, polyoxyethylene polyoxypropylene alkyl ethers, polyoxyethylene glycerol fatty acid esters, polyethylene glycol fatty acid esters, polyglycerol fatty acid esters, sorbitan fatty acid esters, propylene glycol fatty acid esters, and acetylene glycol. Other preferred examples include SURFYNOL (manufactured by Air Products and Chemicals, Inc., trade name), which are acetylene-based polyoxyethylene oxide surfactants.

Other examples include surfactants described in JP1984-157636A (JP-S59-157636A), pages (37) to (38), and Research Disclosure No. 308119 (1989).

When such surfactants are used, surfactants may be used alone or in combination of two or more thereof.

The surfactant content of a coloring composition according to the present invention relative to the total mass of the coloring composition is preferably in the range of 0.001 mass % to 5.0 mass %. Adjustment is preferably performed within this range to provide the coloring composition that exhibits a desired surface tension.

Various Additives

A coloring composition according to the present invention may further contain various known additives. Examples of the additives include pH adjusting agents such as acids, bases, and buffer solutions, fluorescent brightening agents, surface tension adjusting agents, anti-foaming agents, anti-drying agents, lubricants, thickeners, ultraviolet absorbents, anti-fading agents, antistatic agents, matting agents, antioxidants, resistivity adjusting agents, anticorrosives, inorganic pigments, anti-reducing agents, preservatives, fungicides, chelating agents, and crosslinking agents.

Ultraviolet Absorbents

Examples of the ultraviolet absorbents include benzotriazole-based compounds described in JP1983-185677A (JP-S58-185677A), JP1986-190537A (JP-S61-190537A), JP1990-782A (JP-H2-782A), JP1993-197075A (JP-H5-197075A), and JP1997-34057A (JP-H9-34057A), for example; benzophenone-based compounds described in JP1971-2784A (JP-S46-2784A), JP1993-194483A (JP-H5-194483A), and U.S. Pat. No. 3,214,463A, for example; cinnamic acid-based compounds described in JP1973-30492B (JP-S48-30492B), JP1981-21141B (JP-S56-21141B), and JP1998-88106A (JP-H10-88106A), for example; triazine-based compounds described in JP1992-298503A (JP-H4-298503A), JP1996-53427A (JP-H8-53427A), JP1996-239368A (JP-H8-239368A), JP1998-182621A (JP-H10-182621A), and JP1996-501291A (JP-H8-501291A), for example; compounds described in Research Disclosure No. 24239; and compounds that absorb ultraviolet radiation and emit fluorescence, and that are represented by stilbene-based compounds and benzoxazole-based compounds, namely, fluorescent brightening agents. The coloring composition may contain an ultraviolet absorbent, to thereby provide images having improved storage stability.

Anti-Fading Agents

Examples of the anti-fading agents include various organic or metal-complex anti-fading agents. Examples of the organic anti-fading agents include hydroquinones, alkoxyphenols, dialkoxyphenols, phenols, anilines, amines, indans, chromans, alkoxyanilines, and heterocycles. Examples of the metal complexes include nickel complexes and zinc complexes. More specific examples include compounds described in patents cited in Research Disclosure No. 17643, VII, I and J, Research Disclosure No. 15162, Research Disclosure No. 18716, page 650, left column, Research Disclosure No. 36544, page 527, Research Disclosure No. 307105, page 872, and Research Disclosure No. 15162; and compounds included in compound examples and general formulas of representative compounds described in JP1987-215272A (JP-S62-215272A), pages 127 to 137, and U.S. Pat. No. 5,356,443A. The coloring composition may contain an anti-fading agent, to thereby provide images having improved storage stability.

Preservatives and Fungicides

In order to ensure long-term preservation stability of a coloring composition according to the present invention, the coloring composition may contain at least one of a preservative and a fungicide. The coloring composition may contain a preservative or a fungicide, to thereby have improved long-term preservation stability. Examples of the preservative and fungicide include aromatic halogen compounds (for example, Preventol CMK; manufactured by LANXESS, trade name), methylene dithiocyanate, halogen-containing nitrogen-sulfur compounds, 1,2-benzisothiazolin-3-one (for example, PROXEL GXL; manufactured by Arch Chemicals, Inc., trade name), sodium dehydroacetate, sodium benzoate, sodium pyridinethione-1-oxide, ethyl-p-hydroxybenzoate, 1,2-benzisothiazolin-3-one, and salts of the foregoing.

Such preservatives and fungicides may be used alone or in combination of two or more thereof. When the coloring composition contains a preservative and a fungicide, the amount of the preservative and the fungicide contained relative to the total mass of the coloring composition is preferably 0.02 mass % to 1.00 mass %.

Anti-Drying Agents

The anti-drying agents are preferably aqueous organic solvents having lower vapor pressures than water. The coloring composition may contain an anti-drying agent, so that, in the case of application to inkjet recording, in nozzle ejection ports of an ejection head for ejecting the coloring composition, clogging due to the coloring composition having dried can be prevented. Specific examples of the anti-drying agents include polyhydric alcohols represented by ethylene glycol, propylene glycol, diethylene glycol, polyethylene glycol, thiodiglycol, dithiodiglycol, 2-methyl-1,3-propanediol, 1,2,6-hexanetriol, acetylene glycol derivatives, glycerol, and trimethylolpropane; lower alkyl ethers of polyhydric alcohols such as ethylene glycol monomethyl (or ethyl) ether, diethylene glycol monomethyl (or ethyl) ether, and triethylene glycol monoethyl (or butyl) ether; heterocycles such as 2-pyrrolidone, N-methyl-2-pyrrolidone, 1,3-dimethyl-2-imidazolidinone, and N-ethylmorpholine; sulfur-containing compounds such as sulfolane, dimethyl sulfoxide, and 3-sulfolene; multifunctional compounds such as diacetone alcohol, and diethanolamine; and urea derivatives. Of these, more preferred are polyhydric alcohols such as glycerol, and diethylene glycol.

Such anti-drying agents may be used alone or in combination of two or more thereof. When the coloring composition contains such an anti-drying agent, the anti-drying agent content relative to the total mass of the coloring composition is preferably 10 mass % to 50 mass %.

pH Adjusting Agents

Examples of the pH adjusting agents include neutralizing agents such as organic bases and inorganic alkalis. In the case of using the coloring composition for inkjet recording, the coloring composition may contain a pH adjusting agent, so that the coloring composition has improved preservation stability. The pH adjusting agent is preferably added such that the coloring composition has a pH of 5 to 12, more preferably a pH of 5 to 9.

Surface Tension Adjusting Agents and Anti-Foaming Agents

Examples of the surface tension adjusting agents include various surfactants such as nonionic surfactants, cationic surfactants, and anionic surfactants. Preferred examples of the surfactants are the same as those described above as examples in the Surfactant section.

The anti-foaming agents are preferably fluoro compounds and silicone compounds.

When a coloring composition according to the present invention is used for inkjet (inkjet ink), the coloring composition is preferably adjusted so as to exhibit a surface tension of 20 mN/m to 70 mN/m, more preferably 25 mN/m to 60 mN/m. When the coloring composition is used for inkjet, the coloring composition is preferably adjusted so as to have a viscosity of 40 mPa·s or less, more preferably 30 mPa·s or less, particularly preferably 20 mPa·s or less.

The surface tension and the viscosity can be adjusted by adding various additives, for example, a viscosity adjusting agent, a surface tension adjusting agent, a resistivity adjusting agent, a coating adjusting agent, an ultraviolet absorbent, an antioxidant, an anti-fading agent, a fungicide, an anticorrosive, a dispersing agent, and a surfactant.

Chelating Agents

Chelating agents are preferably used for the purpose of preventing generation of precipitate such as sediment in the coloring composition, or for the purpose of improving preservation stability or recoverability from clogging. When dye is used as a coloring agent of a coloring composition, metal (Ca, Mg, Si, or Fe, for example) contained in the coloring composition may cause generation of precipitate or degradation of recoverability from clogging; thus, it is known that metal ions need to be controlled to be in a certain amount or less. It is also known that, in the case of using copper complex dye, control of the amount of metal ions without control of the amount of free copper ions results in generation of precipitate or degradation of recoverability from clogging (refer to JP2000-355665A and JP2005-126725A, for example).

Examples of the chelating agents include ethylenediaminetetraacetic acid (EDTA), nitrilotriacetic acid, hydroxyethylethylenediaminetriacetic acid, uramildiacetic acid, and metallic salts of the foregoing (for example, sodium salts).

Crosslinking Agents

For the purpose of improving the abrasion resistance and colorfastness to washing and laundering of colored cloths, the coloring composition may contain a crosslinking agent. Examples of the crosslinking agent include blocked isocyanate crosslinking agents (for example, Meikanate series CX, TP-10, and DM-35HC, and SU-268A, all manufactured by Meisei Chemical Works, Ltd., trade names), and multifunctional epoxy crosslinking agents (for example, Denacol series EX-313, 314, 322, and 411, all manufactured by Nagase ChemteX Corporation, trade names).

A coloring composition according to the present invention is suitably usable as an inkjet ink in which the amount of coloring agent supplied onto textiles is limited.

Inkjet Ink

The present invention also relates to an inkjet ink including an aqueous dispersion of a dye polymer having a structure derived from a dye having a xanthene skeleton. The inkjet ink is preferably used for textile printing. The components included in the inkjet ink are the same as those described above for a coloring composition according to the present invention.

The amounts of the dye polymer and other components contained in the inkjet ink may be set to satisfy the content ranges described above for a coloring composition according to the present invention.

An inkjet ink including an aqueous dispersion of a dye polymer according to the present invention can be used for direct printing on textiles not having undercoating of printing paste without causing bleeding. Thus, the inkjet ink is particularly advantageous from the viewpoint of operability.

Ink Cartridge

An ink cartridge according to the present invention is an ink cartridge including the above-described inkjet ink according to the present invention filling the ink cartridge.

Inkjet Textile Printing Method

An inkjet textile printing method according to the present invention is an inkjet textile printing method at least having a step of performing direct printing on a textile by an inkjet method with an inkjet ink including an aqueous dispersion of a dye polymer having a structure derived from a dye having a xanthene skeleton.

An inkjet textile printing method according to the present invention provides advantages of enabling direct printing on various types of textiles by simple operation, without causing bleeding, and without generation of waste liquid or waste materials such as transfer paper.

A heating step may further be performed to fuse the dye polymer to the fiber, so that the dye polymer is further integrated with the fiber, to further impart, for example, abrasion resistance without degradation of the feeling, which are advantageous.

Heat Treatment Step

An inkjet textile printing method according to the present invention preferably further includes a heat treatment step. In particular, after printing on a textile, a heat treatment step may be performed to melt (or soften) dye polymer particles, to improve adhesiveness to the fiber (in other words, the heat treatment enables melt-dyeing). Colored cloths after being dried are preferably heat-treated for the purpose of achieving the melt-dyeing, preferably normally at 100° C. to 250° C., more preferably 100° C. to 200° C., particularly preferably 120° C. to 200° C. For the heat treatment time, the heat treatment is preferably performed for 30 seconds to 3 minutes. In this heat treatment step, a reactive group (for example, a blocked isocyanate group) introduced into the dye polymer or a crosslinking agent (for example, a blocked isocyanate crosslinking agent or a multifunctional epoxy crosslinking agent) used as an additive to the dye polymer is preferably used to cause a crosslinking reaction from the viewpoint of abrasion resistance.

Since the heat treatment step is preferably performed at the above-described temperature, the dye polymer melts preferably at 200° C. or less, more preferably at 180° C. or less.

Whether or not the dye polymer melts at a specific temperature can be determined with a melting point apparatus: the dye polymer is heated at 10° C./min to the specific temperature, and the state of the dye polymer is visually inspected.

Posttreatment

A textile colored with an inkjet ink including an aqueous dispersion of a dye polymer according to the present invention causes less bleeding, and is excellent in terms of soft feeling and colorfastness (abrasion resistance). However, as needed, the colored cloth may be treated by subjecting the entire surface of the colored cloth to padding treatment using a posttreatment agent, to thereby provide a colored cloth having further improved soft feeling and colorfastness (in particular, abrasion resistance). Examples of the posttreatment agent that is used for softening include cationic surfactants, anionic surfactants, nonionic surfactants, dimethyl silicone oil, amino silicone oil, carboxy-modified silicone oil, hydroxy-modified silicone oil, fatty acid, fatty acid amide, mineral oil, vegetable oil, animal oil, and plasticizer.

Examples of the posttreatment agent that is used for improving the smoothness of surfaces of colored cloths include metallic soap, paraffin wax, carnauba wax, microcrystalline wax, dimethyl silicone oil, amino silicone oil, carboxy-modified silicone oil, and hydroxy-modified silicone oil.

The padding treatment is performed such that a colored cloth is immersed in what is prepared by emulsification, thermal emulsification, or dispersion of such a posttreatment agent in an aqueous solvent by stirring with a mixer, dried by wringing with, for example, a mangle, and treated by heat treatment.

The posttreatment agent may be prepared so as to contain, as a fixing agent, a small amount of resin emulsion, to thereby provide colored cloths having improved abrasion resistance. The amount added to the posttreatment agent is preferably less than 5%, which is preferred because the addition tends not to degrade the soft feeling of colored cloths.

The resin emulsion added, as a fixing agent, to the posttreatment agent is not particularly limited. Examples of the resin emulsion include acrylate resin emulsion, urethane resin emulsion, ethylene-vinyl acetate copolymer resin (EVA resin) emulsion, silicone/acrylic resin emulsion, and polyester resin emulsion. In order to provide colored cloths having soft feeling, such resin emulsions preferably have glass transition points of 0° C. or less.

Textile

Textiles to which an inkjet textile printing method according to the present invention is applicable are as follows. Examples of raw textile (fiber species) include synthetic fibers such as nylon, polyester, or acrylonitrile, semi-synthetic fibers such as acetate or rayon, natural fibers such as cotton, silk, or hair, mixed fibers of the foregoing, webs, knitting, and nonwoven fabrics.

Examples of clothing include T-shirts, sweat shirts, jerseys, pants, sweat suits, one-pieces, and blouses. Other preferred examples include bedclothes and handkerchiefs.

Colored fiber products produced by an inkjet textile printing method according to the present invention have advantages in terms of all characteristics that are feeling, colorfastness to washing and laundering, colorfastness to rubbing, and textile printing operability. Therefore, an inkjet textile printing method, a coloring composition, and an inkjet ink according to the present invention are highly valuable.

EXAMPLES

Synthesis Example 1

Synthesis of Dye Polymer (D-1-5)

Exemplary compound (D-1-5) was synthesized by the following scheme.

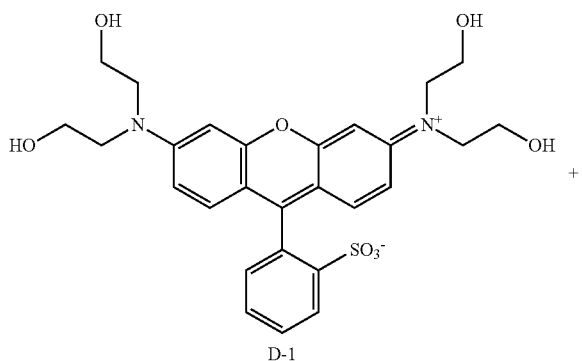

D-1

-continued

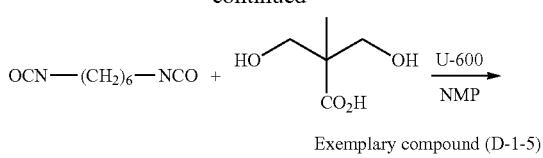

Exemplary compound (D-1-5)

To a 200-mL three-neck flask, 5.0 g of D-1, 1.05 g of 2,2-bis(hydroxymethyl)propionic acid, and 61.2 g of N-methylpyrrolidone (NMP) were added, and heated to an internal temperature of 90° C. To this, 164 mg of NEOSTANN U-600 (manufactured by Nitto Kasei Co., Ltd., trade name), and 4.96 g of 1,6-hexamethylene diisocyanate were added. After completion of the dropping, the reaction was caused at 90° C. for 4 hours. The reaction solution was left to cool to 20° C., and poured into 600 mL of a 0.1 mol/L sodium hydroxide aqueous solution; subsequently, 660 mL of 1 mol/L aqueous hydrochloric acid was added, and filtration was performed. The resultant residue was added to 600 mL of a 0.1 mol/L sodium hydroxide aqueous solution, and stirred for 10 minutes; subsequently 1 mol/L aqueous hydrochloric acid was added to adjust the pH to 5.2; and filtration was performed. The resultant residue was poured into 600 mL of water, stirred for 10 minutes, and then filtered. The resultant residue was dried with a reduced pressure dryer at 60° C. for 3 hours, to obtain Exemplary compound (D-1-5) in a yield of 10.1 g. Exemplary compound (D-1-5) in a dilute solution of methanol/chloroform=1/1 was found to have a maximum absorption wavelength of 559 nm in a UV-visible absorption spectrum. The weight-average molecular weight (Mw) measured by GPC was found to be 12,500 (polymethyl methacrylate equivalent).

Synthesis of Dye Polymer (D-2-5)

Exemplary compound (D-2-5) was synthesized by the following scheme.

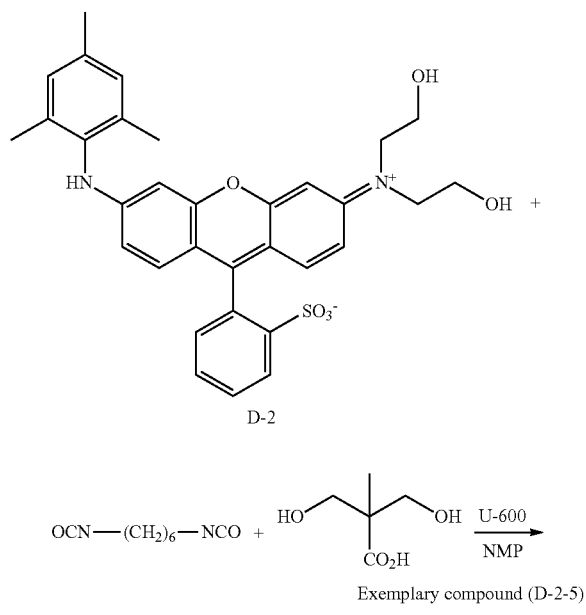

Exemplary compound (D-2-5)

To a 200-mL three-neck flask, 5.0 g of D-2, 0.79 g of 2,2-bis(hydroxymethyl)propionic acid, and 45.8 g of N-methylpyrrolidone (NMP) were added, and heated to an internal temperature of 90° C. To this, 81 mg of NEOSTANN U-600 (manufactured by Nitto Kasei Co., Ltd., trade name), and 2.46 g of 1,6-hexamethylene diisocyanate were added. After completion of the dropping, the reaction was caused at 90° C. for 4 hours. The reaction solution was left to cool to 20° C., and poured into 1 L of a 0.1 mol/L sodium hydroxide aqueous solution; subsequently, 110 mL of 1 mol/L aqueous hydrochloric acid was added, and filtration was performed. The resultant residue was added to 1 L of a 0.1 mol/L sodium hydroxide aqueous solution, and stirred for 10 minutes; subsequently 1 mol/L aqueous hydrochloric acid was added to adjust the pH to 5.2; and filtration was performed. The resultant residue was poured into 500 mL of water, stirred for 10 minutes, and then filtered. The resultant residue was dried with a reduced pressure dryer at 60° C. for 3 hours, to obtain Exemplary compound (D-2-5) in a yield of 21.7 g. Exemplary compound (D-2-5) in a dilute solution of methanol/chloroform=1/1 was found to have a maximum absorption wavelength of 554 nm in a UV-visible absorption spectrum. The weight-average molecular weight (Mw) measured by GPC was found to be 12,700 (polymethyl methacrylate equivalent).

Synthesis of Dye Polymers (D-2-1) to (D-2-4) and (D-2-6) to (D-2-9)

Synthesis was performed as in (D-2-5) except that the amounts of reagents used were changed. Incidentally, the amount of NMP used was adjusted such that, relative to the amount, the total mass of D-2,2,2-bis(hydroxymethyl)propionic acid, and 1,6-hexamethylene diisocyanate corresponded to 18 mass %. The amount of NEOSTANN U-600 used was set to 3.3 mass % relative to the amount of 1,6-hexamethylene diisocyanate used. Each of the Exemplary compounds in a dilute solution of methanol/chloroform=1/1 was found to have a maximum absorption wavelength of 554 nm in a UV-visible absorption spectrum.

Synthesis of Dye Polymers (D-2-10) to (D-2-17)

Synthesis was performed as in (D-2-5) except that the reaction time was changed. Each of the Exemplary compounds in a dilute solution of methanol/chloroform=1/1 was found to have a maximum absorption wavelength of 554 nm in a UV-visible absorption spectrum.

Synthesis of Dye Polymer (D-2-18)

Synthesis was performed as in (D-2-5) except that the pH after addition of 1 mol/L aqueous hydrochloric acid was changed from 5.2 to 7.0. Exemplary compound (D-2-18) in a dilute solution of methanol/chloroform=1/1 was found to have a maximum absorption wavelength of 556 nm in a UV-visible absorption spectrum.

Synthesis of Dye Polymer (D-2-19)

Synthesis was performed as in (D-2-18) except that the 0.1 mol/L sodium hydroxide aqueous solution was changed to a 0.1 mol/L potassium hydroxide aqueous solution. Exemplary compound (D-2-19) in a dilute solution of methanol/chloroform=1/1 was found to have a maximum absorption wavelength of 556 nm in a UV-visible absorption spectrum.

Synthesis of Dye Polymer (D-3-2)

Exemplary compound (D-3-2) was synthesized as with Exemplary compound (D-2-5) except that, as described in the following scheme, D-2 was changed to D-3, and 1,6-hexamethylene diisocyanate was changed to isophorone diisocyanate. Exemplary compound (D-3-2) in a dilute solution of methanol/chloroform=1/1 was found to have a maximum absorption wavelength of 555 nm in a UV-visible absorption spectrum.

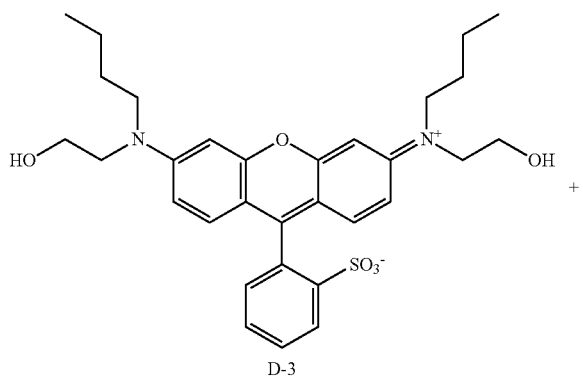

D-3

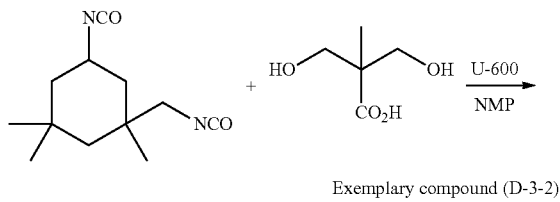

Exemplary compound (D-3-2)

Synthesis of Dye Polymer (D-5-1)

Exemplary compound (D-5-1) was synthesized as with Exemplary compound (D-2-5) except that, as described in the following scheme, D-2 was changed to D-5. Exemplary compound (D-5-1) in a dilute solution of methanol/chloroform=1/1 was found to have a maximum absorption wavelength of 554 nm in a UV-visible absorption spectrum.

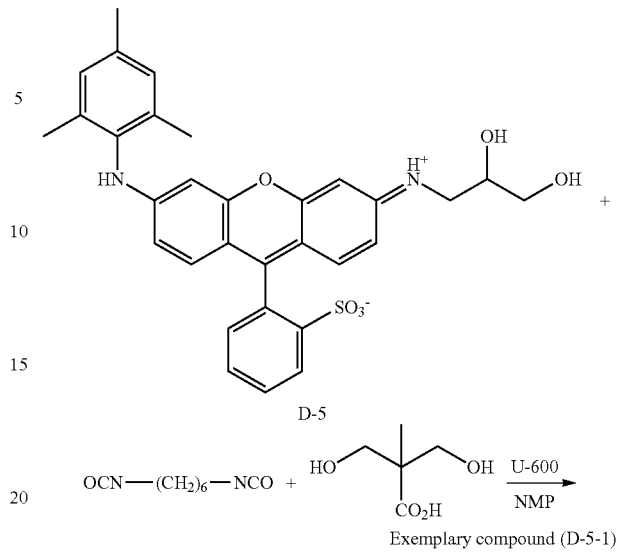

Example 1

Production of Dye Polymer Aqueous Dispersion (1)

Exemplary compound (D-2-1) (1.0 g), 10 g of zirconia beads (manufactured by Nikkato Corporation, trade name: YTZ ball, diameter: 0.1 μm), 0.2 g of sodium oleate, and 3.8 g of ultrapure water were added, and a planetary micro mill (manufactured by FRITSCH, Pulverlsette 7) was used to perform dispersion at 400 rpm (revolution per minute) for 10 hours. From the resultant dispersion liquid, zirconia beads were removed with a filter cloth, to obtain Dye polymer aqueous dispersion (1). The weight-average molecular weight of the dye polymer used, and the average particle size of the particulate dye polymer of the resultant dye polymer aqueous dispersion are described in Tables 1 and 2.

Examples 2 to 23

Similarly, Dye polymer aqueous dispersions (2) to (23) were produced except that the dye polymer and the low-molecular surfactant or high-molecular dispersing agent were changed to the types and amounts described in the following Tables 1 and 2. DEMOL NL is manufactured by Kao Corporation.

TABLE 1

| Example | Dye polymer aqueous dispersion | Dye polymer Type | Amount (g) | Low-molecular surfactant or high-molecular dispersing agent used Type | Amount (g) | Weight average molecular weight (Mw) | Average particle size Mv (nm) |
|---|---|---|---|---|---|---|---|
| Example 1  | (1)  | (D-2-1)  | 1.0 | Sodium oleate | 0.2 | 10,500 | 110 |
| Example 2  | (2)  | (D-2-2)  | 1.0 | Sodium oleate | 0.2 |  9,900 |  82 |
| Example 3  | (3)  | (D-2-3)  | 1.0 | Sodium oleate | 0.2 | 11,600 |  64 |
| Example 4  | (4)  | (D-2-4)  | 1.0 | Sodium oleate | 0.2 | 13,200 |  39 |
| Example 5  | (5)  | (D-2-5)  | 1.0 | Sodium oleate | 0.2 | 12,700 |  32 |
| Example 6  | (6)  | (D-2-6)  | 1.0 | Sodium oleate | 0.2 | 11,900 |  91 |
| Example 7  | (7)  | (D-2-7)  | 1.0 | Sodium oleate | 0.2 | 12,200 |  98 |
| Example 8  | (8)  | (D-2-8)  | 1.0 | Sodium oleate | 0.2 |  9,600 |  62 |
| Example 9  | (9)  | (D-2-9)  | 1.0 | Sodium oleate | 0.2 | 11,400 |  52 |
| Example 10 | (10) | (D-2-10) | 1.0 | Sodium oleate | 0.2 |  2,400 | 275 |
| Example 11 | (11) | (D-2-11) | 1.0 | Sodium oleate | 0.2 |  3,700 | 182 |
| Example 12 | (12) | (D-2-12) | 1.0 | Sodium oleate | 0.2 |  5,400 | 127 |

TABLE 2

| Example | Dye polymer aqueous dispersion | Dye polymer Type | Dye polymer Amount (g) | Low-molecular surfactant or high-molecular dispersing agent used Type | Low-molecular surfactant or high-molecular dispersing agent used Amount (g) | Weight-average molecular weight (Mw) | Average particle size Mv (nm) |
|---|---|---|---|---|---|---|---|
| Example 13 | (13) | (D-2-13) | 1.0 | Sodium oleate | 0.2 | 27,800 | 92 |
| Example 14 | (14) | (D-2-14) | 1.0 | Sodium oleate | 0.2 | 53,900 | 195 |
| Example 15 | (15) | (D-2-15) | 1.0 | Sodium oleate | 0.2 | 78,200 | 320 |
| Example 16 | (16) | (D-2-16) | 1.0 | Sodium oleate | 0.2 | 152,800 | 425 |
| Example 17 | (17) | (D-2-17) | 1.0 | Sodium oleate | 0.2 | 214,400 | 498 |
| Example 18 | (18) | (D-2-18) | 1.0 | — | — | 12,300 | 34 |
| Example 19 | (19) | (D-2-19) | 1.0 | — | — | 12,700 | 56 |
| Example 20 | (20) | (D-1-5) | 1.0 | Sodium oleate | 0.2 | 12,500 | 43 |
| Example 21 | (21) | (D-3-2) | 1.0 | Sodium oleate | 0.2 | 13,100 | 75 |
| Example 22 | (22) | (D-5-1) | 1.0 | Sodium oleate | 0.2 | 2,700 | 86 |
| Example 23 | (23) | (D-2-5) | 1.0 | DEMOL NL | 0.2 | 12,700 | 278 |

Example A1

Production of Inkjet Textile Printing Ink (A1)

The following components were mixed together at 20° C., stirred for 15 minutes, subsequently filtered through a membrane filter (average pore size: 0.8 μm), to prepare Inkjet textile printing ink (A1).

| | |
|---|---|
| Dye polymer aqueous dispersion (1) | 3.0 g |
| Trimethylolpropane | 0.056 g |
| Ultrapure water | 0.913 g |
| 1,2-Hexanediol | 0.112 g |
| Glycerol | 0.560 g |
| Triethylene glycol monobutyl ether | 0.112 g |
| 2-Pyrrolidone | 0.168 g |
| Propylene glycol | 0.028 g |
| SURFYNOL 465 (manufactured by Nissin Chemical Industry Co., Ltd. trade name) | 0.056 g |

Inkjet Textile Printing Method

Inkjet textile printing ink (A1) was filled into an ink cartridge. An inkjet printer (Colorio PX-045A, manufactured by SEIKO EPSON CORPORATION, trade name) was used to print images on a polyester textile (product name: Polyester tropical (manufactured by TEIJIN LIMITED), retailer: SHIKISENSHA CO., LTD., product code: A02-01019), a cotton textile (cotton broad cloth, mercerized, manufactured by SHIKISENSHA CO., LTD., product code: A02-01002), and a 65% polyester-35% cotton mixture (a mixed 65 polyester/35 cotton broad cloth, manufactured by SHIKISENSHA CO., LTD., product code: A02-01030), and drying was performed at 20° C. for 12 hours. After the drying, a heat-press (manufactured by Asahi Garment Machinery Co., LTD., trade name: desktop automatic flat press AF-54TEN) was used to perform heat-treatment at a temperature of 120° C., a pressure of 0.20 N/cm$^2$, for a period of 60 seconds, to thereby provide sharp images without bleeding.

Examples A2 to A23

Inkjet textile printing inks (A2) to (A23) were prepared as with Inkjet textile printing ink (A1) except that Dye polymer aqueous dispersion (1) in Example A1 was changed to Dye polymer aqueous dispersions (2) to (23).

Inkjet textile printing was performed as in Example A1 except that the Inkjet textile printing ink used was changed to Inkjet textile printing inks in Table 3 below.

Comparative Example 1

Sublimation Transfer Textile Printing

A sublimation transfer textile printer SureColor F6000 (manufactured by SEIKO EPSON CORPORATION, trade name) was used to print images on transfer paper, and subsequently to print the images on a polyester textile (product name: Polyester tropical (manufactured by TEIJIN LIMITED), retailer: SHIKISENSHA CO., LTD., product code: A02-01019), a cotton textile (cotton broad cloth, mercerized, manufactured by SHIKISENSHA CO., LTD., product code: A02-01002), and a 65% polyester-35% cotton mixture (a mixed 65 polyester/35 cotton broad cloth, manufactured by SHIKISENSHA CO., LTD., product code: A02-01030); and drying was performed at 20° C. for 12 hours. After the drying, a heat-press (manufactured by Asahi Garment Machinery Co., LTD., trade name: desktop automatic flat press AF-54TEN) was used to perform heat-treatment at a temperature of 200° C., at a pressure of 0.20 N/cm$^2$, for a period of 60 seconds, to obtain transferred images. On the polyester textile, a sharp image was obtained. However, on the 65% polyester-35% cotton mixture, the image obtained was sharp but had a shallow depth of color; and, on the cotton textile, a seriously blurred image was obtained.

Comparative Example 2

Coloring by Inkjet Method Using Pigment

Preparation of Pigment Dispersion Liquid

A styrene-acrylic acid copolymer (JONCRYL 678, manufactured by BASF, trade name) (3 g), 1.3 g of dimethylaminoethanol, and 80.7 g of ion-exchanged water were stirred and mixed at 70° C. Subsequently, 15 g of C.I. Pigment Blue 15:3 was added, zirconia beads having a bead size of 0.5 nm were added to a volume ratio of 50%, and a sand grinder mill was used to perform dispersion, to obtain a pigment dispersion liquid having a cyan pigment content of 15%.

Preparation of Aqueous Binder

To a three-neck flask, 50 g of 2-butanone was placed, and heated to an internal temperature of 75° C.; to this, a mixture was dropped over 3 hours that contained 80 g of n-butyl methacrylate, 20 g of acrylic acid, 50 g of 2-butanone, and 0.5 g of azoisobutyronitrile. After the dropping, heating was performed for 5 hours under reflux, cooling was performed to 20° C., and heating under a reduced pressure was performed to obtain a polymer residue. To this, 350 mL of ion-exchanged water and sodium hydroxide in an amount of moles 1.05 times that of acrylic acid added as a monomer were added to achieve dissolution. Dilution with ion-exchanged water was performed such that the total amount became 500 g, to obtain a 20% aqueous solution of the aqueous binder.

Preparation of Pigment Ink, and Coloring by Inkjet Method

The pigment dispersion liquid (46.6 g), 15 g of the aqueous binder, 2.9 g of PDX-7664A (manufactured by BASF, trade name), 10 g of triethylene glycol monobutyl ether, 5 g of 1,2-hexanediol, 11.2 g of diethylene glycol, and 0.6 g of OLFINE 465 (manufactured by Nissin Chemical Industry Co., Ltd., trade name) were mixed. To this, ion-exchanged water was added such that the total amount became 100 g; and filtration through a 0.8 μm filter was performed to obtain a pigment ink for comparison.

The obtained pigment ink was charged into an ink cartridge; an inkjet printer (Colorio PX-045A, manufactured by SEIKO EPSON CORPORATION, trade name) was used to print images on a polyester textile (product name: Polyester tropical (manufactured by TEIJIN LIMITED), retailer: SHIKISENSHA CO., LTD., product code: A02-01019), a cotton textile (cotton broad cloth, mercerized, manufactured by SHIKISENSHA CO., LTD., product code: A02-01002), and a 65% polyester-35% cotton mixture (a mixed 65 polyester/35 cotton broad cloth, manufactured by SHIKI-SENSHA CO., LTD., product code: A02-01030), and drying was performed at 20° C. for 12 hours. After the drying, a heat-press (manufactured by Asahi Garment Machinery Co., LTD., trade name: desktop automatic flat press AF-54TEN) was used to perform heat-treatment at a temperature of 100° C., at a pressure of 0.20 N/cm$^2$, for a period of 60 seconds, to obtain colored cloths having been subjected to printing with the pigment ink.

The evaluation results of the above-described Examples A1 to A23, and Comparative Examples 1 and 2 are also described in Table 3. Incidentally, the results of the colored cloths were obtained by evaluation methods below. For evaluations of feeling and colorfastness to rubbing (dry type), among the three textiles, the cotton textile was used.

Image sharpness: A sensory evaluation was visually performed. Cases were evaluated into four grades: cases where all three textiles had sharp images were evaluated as A; cases where two textiles had sharp images were evaluated as B; cases where one textile alone had a sharp image were evaluated as C; and cases of no sharp images were evaluated as D.

Feeling: Untreated cloths before dyeing and colored cloths after dyeing were touched with the hand to perform a sensory evaluation in terms of feeling of the colored cloths. Colored cloths having good feeling close to that of the untreated cloths were evaluated as 10 points, and the other colored cloths were evaluated as 0 points; this evaluation was performed by 10 persons, and values of the total points are described in Table 3 below. The larger such a value, the better and closer to the untreated cloths (100 (points)) the feeling.

Colorfastness to rubbing (dry type): Evaluation was performed in accordance with "JIS Handbook 31 Fiber" edited by Japanese Standards Association, published in 2015, on the basis of JIS L-0849 Gakushin rubbing test.

In the evaluation results in terms of colorfastness to rubbing (dry type), the larger the value, the better the colorfastness.

TABLE 3

| | Inkjet textile printing ink | Dye polymer aqueous dispersion | Image sharpness | Feeling | Colorfastness to rubbing (dry type) (Grade) |
|---|---|---|---|---|---|
| Example A1 | (A1) | (1) | A | 95 | 4 to 5 |
| Example A2 | (A2) | (2) | A | 95 | 4 to 5 |
| Example A3 | (A3) | (3) | A | 95 | 4 to 5 |
| Example A4 | (A4) | (4) | A | 95 | 4 to 5 |
| Example A5 | (A5) | (5) | A | 95 | 4 to 5 |
| Example A6 | (A6) | (6) | A | 95 | 4 to 5 |
| Example A7 | (A7) | (7) | A | 95 | 4 |
| Example A8 | (A8) | (8) | B | 95 | 3 to 4 |
| Example A9 | (A9) | (9) | B | 95 | 3 |
| Example A10 | (A10) | (10) | A | 95 | 3 |
| Example A11 | (A11) | (11) | A | 95 | 3 to 4 |
| Example A12 | (A12) | (12) | A | 95 | 3 to 4 |
| Example A13 | (A13) | (13) | A | 95 | 4 |
| Example A14 | (A14) | (14) | A | 95 | 4 |
| Example A15 | (A15) | (15) | A | 90 | 4 to 5 |
| Example A16 | (A16) | (16) | A | 90 | 4 to 5 |
| Example A17 | (A17) | (17) | A | 90 | 4 to 5 |
| Example A18 | (A18) | (18) | A | 95 | 4 |
| Example A19 | (A19) | (19) | A | 95 | 4 |
| Example A20 | (A20) | (20) | A | 95 | 4 to 5 |
| Example A21 | (A21) | (21) | A | 90 | 4 to 5 |
| Example A22 | (A22) | (22) | A | 90 | 3 |
| Example A23 | (A23) | (23) | A | 90 | 3 to 4 |
| Comparative Example 1 | — | — | C | 100 | 4 to 5 |
| Comparative Example 2 | — | — | A | 80 | 2 to 3 |

As is clear from the above-described results, the inkjet textile printing methods of Examples have texture versatility (provide sharp images on various textures), and provide dyed cloths that have good feeling and have high colorfastness to rubbing (dry type). In addition, the inkjet textile printing methods of Examples, which do not require the step of applying printing paste and do not generate waste liquid or waste materials, are excellent in terms of environmental load, and do not have problems of operability.

The present invention provides an inkjet textile printing method that enables dyeing of various types of textiles, that does not require the step of applying printing paste, that is excellent in terms of environmental load, that is performed with sufficient operability, that provides images having high sharpness and high colorfastness, and that provides colored cloths of high quality (feeling). The present invention also provides a dye polymer, a coloring composition, and an inkjet ink that enable dyeing of various types of textiles, that do not require the step of applying printing paste, that are excellent in terms of environmental load, that enable sufficient operability, and that provide images having high sharpness and high colorfastness and colored cloths of high quality (feeling); and an ink cartridge including the inkjet ink filling the ink cartridge.

The present invention has been described in detail and with reference to specific embodiments; however, those skilled in the art would clearly understand that the embodiments can be changed or modified in various ways without departing from the spirit and scope of the present invention.

What is claimed is:

1. An inkjet textile printing method comprising a step of performing direct printing on a textile by an inkjet method with an inkjet ink including an aqueous dispersion of a dye polymer having a structure derived from a dye having a xanthene skeleton, wherein the dye polymer further has a urethane bond.

2. The inkjet textile printing method according to claim 1, wherein the dye polymer further has a repeating unit including —COOM, where M represents a hydrogen atom or a counter cation.

3. The inkjet textile printing method according to claim 1, further comprising a heat treatment step.

4. The inkjet textile printing method according to claim 1, wherein the inkjet ink further includes an aqueous organic solvent.

5. The inkjet textile printing method according to claim 1, wherein the dye polymer has a repeating unit represented by a general formula (1-2) below,

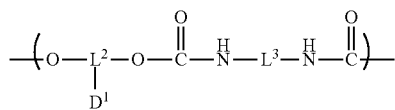
(1-2)

where, in the general formula (1-2), $L^2$ and $L^3$ each independently represent a linking group, and $D^1$ represents a dye residue in which any one hydrogen atom has been removed from a dye having a xanthene skeleton.

6. The inkjet textile printing method according to claim 5, wherein $D^1$ in the general formula (1-2) represents a dye residue in which any one hydrogen atom has been removed from a dye represented by a general formula (M1) below,

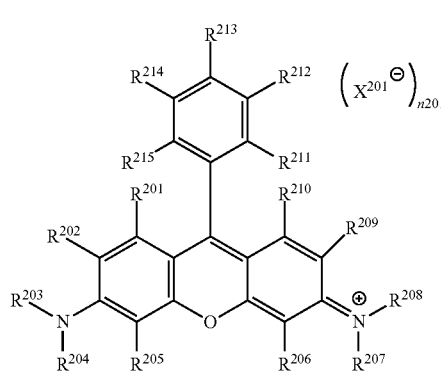
(M1)

where, in the general formula (M1), $R^{201}$ to $R^{215}$ each independently represent a hydrogen atom or a substituent, $X^{201}$ represents a monovalent anion, and n201 represents 0 or 1.

7. The inkjet textile printing method according to claim 1, wherein the dye polymer has a repeating unit represented by a general formula (1-3) below,

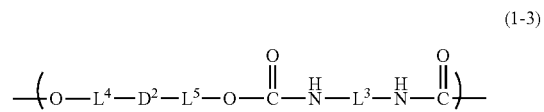
(1-3)

where, in the general formula (1-3), $L^3$ represents a linking group, $L^4$ and $L^5$ each independently represent a single bond or a linking group, and $D^2$ represents a dye residue in which any two hydrogen atoms have been removed from a dye having a xanthene skeleton.

8. The inkjet textile printing method according to claim 7, wherein $D^2$ in the general formula (1-3) represents a dye residue in which any two hydrogen atoms have been removed from a dye represented by a general formula (M1) below,

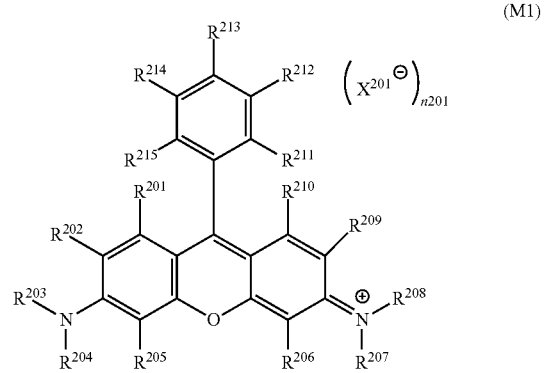
(M1)

where, in the general formula (M1), $R^{201}$ to $R^{215}$ each independently represent a hydrogen atom or a substituent, $X^{201}$ represents a monovalent anion, and n201 represents 0 or 1.

9. A coloring composition comprising an aqueous dispersion of a dye polymer having: a structure derived from a dye having a xanthene skeleton; and a urethane bond, wherein the dye polymer comprises a repeating unit represented by any one of the following general formula (1-2) or (1-3):

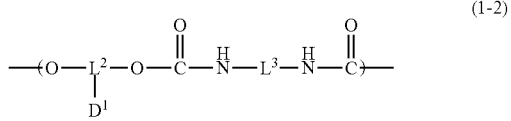
(1-2)

where, in the general formula (1-2),
$L^2$ and $L^3$ each independently represent a linking group, and $D^1$ represents a dye residue in which any one hydrogen atom has been removed from a dye having a xanthene skeleton;

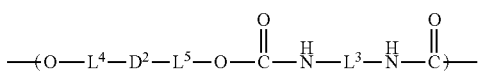
(1-3)

in the general formula (1-3),
$L^3$ represents a linking group,
$L^4$ and $L^5$ each independently represent a single bond or a linking group, and
$D^2$ represents a dye residue in which any two hydrogen atoms have been removed from a dye represented by the following general formula (M1):

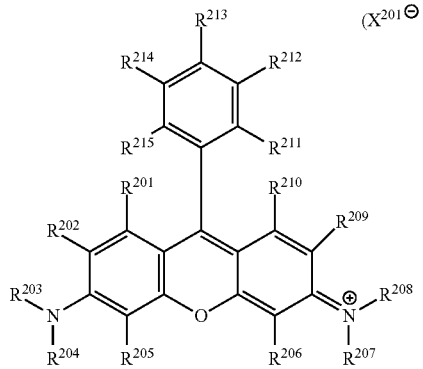
(M1)

where, in the general formula (M1),
$R^{201}$ to $R^{210}$ and $R^{212}$ to $R^{215}$ each independently represent a hydrogen atom or a substituent,
$X^{201}$ represents a monovalent anion, and n201 represents 0 or 1, and
$R^{211}$ represents a carboxylate group or a sulfonate group.

10. An inkjet ink comprising an aqueous dispersion of a dye polymer having: a structure derived from a dye having a xanthene skeleton; and a urethane bond,
wherein the dye polymer comprises a repeating unit represented by any one of the following general formula (1-2) or (1-3):

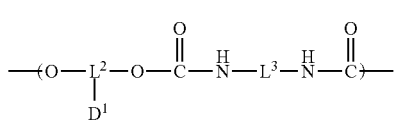
(1-2)

where, in the general formula (1-2),
$L^2$ and $L^3$ each independently represent a linking group, and
$D^1$ represents a dye residue in which any one hydrogen atom has been removed from a dye having a xanthene skeleton;

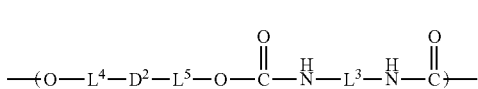
(1-3)

in the general formula (1-3),
$L^3$ represents a linking group,
$L^4$ and $L^5$ each independently represent a single bond or a linking group, and
$D^2$ represents a dye residue in which any two hydrogen atoms have been removed from a dye represented by the following general formula (M1):

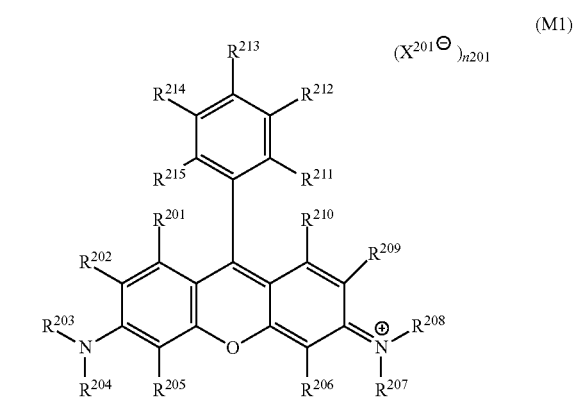
(M1)

where, in the general formula (M1),
$R^{201}$ to $R^{210}$ and $R^{212}$ to $R^{215}$ each independently represent a hydrogen atom or a substituent,
$X^{201}$ represents a monovalent anion, and n201 represents 0 or 1, and
$R^{211}$ represents a carboxylate group or a sulfonate group.

11. An inkjet ink comprising an aqueous dispersion of a dye polymer having: a structure derived from a dye having a xanthene skeleton; and a repeating unit represented by the following general formula (Z):

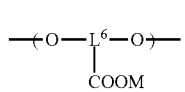
(Z)

where, in the general formula (Z), $L^6$ represents a linking group, and M represents a hydrogen atom or a counter cation.

12. The inkjet ink according to claim 11, further comprising an aqueous organic solvent.

13. The inkjet ink according to claim 11, wherein the dye polymer in the aqueous dispersion of the dye polymer is a particulate dye polymer, and the particulate dye polymer has an average particle size of 30 to 500 nm.

14. The inkjet ink according to claim 11, wherein the dye polymer in the aqueous dispersion of the dye polymer has a weight-average molecular weight of 2,000 to 2,000,000.

15. The inkjet ink according to claim 11, being used for textile printing.

16. An ink cartridge comprising the inkjet ink according to claim 11 filling the ink cartridge.

17. A dye polymer comprising a repeating unit represented by any one of the following general formulae (1-2) or (1-3):

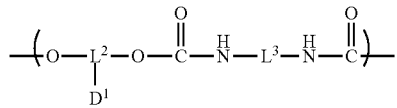
(1-2)

where, in the general formula (1-2),
$L^2$ and $L^3$ each independently represent a linking group, and $D^1$ represents a dye residue in which any one hydrogen atom has been removed from a dye represented by the following general formula (M1):

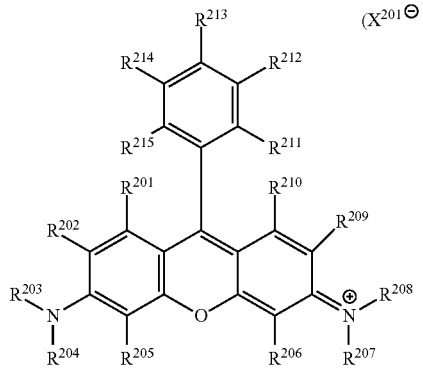
(M1)

where, in the general formula (M1) from which $D^1$ is derived,
$R^{201}$ to $R^{210}$ and $R^{212}$ to $R^{215}$ each independently represent a hydrogen atom or a substituent,
$X^{201}$ represents a monovalent anion, and $n201$ represents 0 or 1, and
$R^{211}$ represents a carboxylate group, a sulfonate group, a substituted or unsubstituted carbamoyl group, or a substituted or unsubstituted sulfamoyl group;

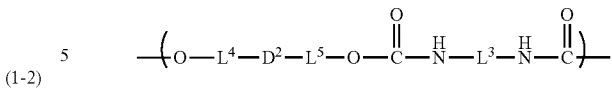
(1-3)

in the general formula (1-3),
$L^3$ represents a linking group,
$L^4$ and $L^5$ each independently represent a single bond or a linking group, and
$D^2$ represents a dye residue in which any two hydrogen atoms have been removed from a dye represented by the following general formula (M1):

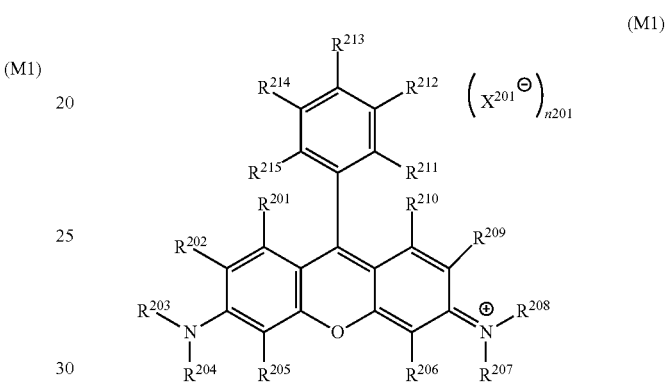
(M1)

where, in the general formula (M1) from which $D^2$ is derived,
$R^{201}$ to $R^{210}$ and $R^{212}$ to $R^{215}$ each independently represent a hydrogen atom or a substituent,
$X^{201}$ represents a monovalent anion, and $n201$ represents 0 or 1, and
$R^{211}$ represents a carboxylate group or a sulfonate group.

18. The dye polymer according to claim 17, further comprising a repeating unit including an acidic group.

* * * * *